(12) United States Patent
Mahon et al.

(10) Patent No.: US 7,095,603 B2
(45) Date of Patent: Aug. 22, 2006

(54) ELECTRODE FOR AN ENERGY STORAGE DEVICE

(75) Inventors: Peter John Mahon, Australian Capital Territory (AU); Clodoveo Simone Sacchetta, New South Wales (AU); Calum John Drummond, Sydney (AU); Phillip Brett Aitchison, Sydney (AU)

(73) Assignee: Energy Storage Systems PTY LTD, Lane Cove (AU)

( * ) Notice: Subject to any disclaimer, the term of this patent is extended or adjusted under 35 U.S.C. 154(b) by 7 days.

(21) Appl. No.: 10/498,916

(22) PCT Filed: Dec. 30, 2002

(86) PCT No.: PCT/AU02/01766

§ 371 (c)(1),
(2), (4) Date: Jun. 15, 2004

(87) PCT Pub. No.: WO03/056585

PCT Pub. Date: Jul. 10, 2003

(65) Prior Publication Data

US 2005/0118440 A1    Jun. 2, 2005

(30) Foreign Application Priority Data

Dec. 28, 2001    (AU) ...................... PR9773

(51) Int. Cl.
*H01G 9/00*    (2006.01)
(52) U.S. Cl. ............ 361/502; 361/503; 361/504; 361/508; 361/512; 361/525; 361/528; 429/210; 429/213
(58) Field of Classification Search ........ 361/502–504, 361/508–512, 516, 523–528; 429/210–213
See application file for complete search history.

(56) References Cited

U.S. PATENT DOCUMENTS 5,098,485 A    3/1992    Evans ..................... 148/272

(Continued)

FOREIGN PATENT DOCUMENTS

EP    1 137 019    9/2001

OTHER PUBLICATIONS

Patent Abstracts of Japan, JP 2000-286164 Oct. 13, 2000 (ELNA Co. Ltd).

(Continued)

*Primary Examiner*—Nguyen T. Ha
(74) *Attorney, Agent, or Firm*—Kenyon & Kenyon LLP

(57) ABSTRACT

An electrode for an energy storage device, including a substrate of at least one metal that forms a native oxide layer; and a treated layer formed on the substrate from the native oxide layer, the treated layer having a resistance that is less than the resistance of a native oxide layer. In some embodiments, the treated layer possesses at least one of the following properties: includes one or more dopants, is thinner than the native oxide layer, has a carbon coating that is applied to the treated layer which improved adhesion characteristics, and others. Further, there is an energy storage device having two or more of such electrodes, wherein the device has a low initial ESR and/or a low ESR at various intervals. Moreover, disclosed is a low resistance metal including a substrate of at least one metal that forms a native oxide layer; and a treated layer formed on the substrate from the native oxide layer, the treated layer having a resistance that is less than the resistance of a native oxide layer. Additionally, methods relating to the above devices are also disclosed.

18 Claims, 8 Drawing Sheets

U.S. PATENT DOCUMENTS

| | | |
|---|---|---|
| 5,578,396 A | 11/1996 | Fauteux et al. ............. 429/209 |
| 6,191,935 B1 | 2/2001 | Okamura et al. ........... 361/502 |
| 2001/0051231 A1 | 12/2001 | Muffoletto et al. ......... 427/533 |

OTHER PUBLICATIONS

Patent Abstracts of Japan, JP 2000-036439 Feb. 2, 2000 (Nichicon Corp).

Patent Abstracts of Japan, JP 2000-012402 Jan. 14, 2000 (Nichicon Corp).

Patent Abstracts of Japan, JP 08-003673, Jan. 9, 1996 (Mitsubishi Alum Co).

Patent Abstracts of Japan, JP 07-169656, Jul. 4, 1995 (Mitsubishi Alum Co).

Patent Abstracts of Japan, JP 63-299309, Dec. 6, 1988 (Matsushita Electric Ind Co Ltd).

ELECTRODE FOR AN ENERGY STORAGE DEVICE

FIELD OF THE INVENTION

The present invention relates to an electrode for an energy storage device and an energy storage device including such an electrode.

The invention has been developed primarily for supercapacitors and will be described hereinafter with reference to that application. It will be appreciated, however, that the invention is not limited to that particular field of use and is also suitable for other energy storage devices such as batteries, fuel cells capacitors and hybrids thereof.

BACKGROUND ART

Operation of Double Layer Capacitors

Known electric double layer (or "EDL") capacitors include opposed electrodes immersed in an electrolyte where the electrodes are maintained in a predetermined, spaced-apart, electrically isolated configuration by an intermediate insulating separator. At least one of the electrodes provides a surface on which an EDL is formed at the electrode-electrolyte interface. Typically the electrode is composed of a metal, or an otherwise conductive, substrate (or "current collector") and is coated with a high surface area material. The coating is typically formed from one or more forms of carbon, and a binder for adhering the carbon to itself and its associated current collector. Other materials can be used to provide an electrode with the high surface area, such as organic molecules (polymers), and inorganic compounds (metal oxides, metal hydroxides, metal phosphates) Accordingly, the electrodes form a single capacitive cell.

The electrodes and intermediate separator are either stacked or wound together, and are disposed within a housing that contains the electrolyte. The electrolyte contains ions that are able to freely move throughout a matrix, such as a liquid or a polymer, and respond to the charge developed on the electrode surface. Further, respective terminals are part of, or connected to, and extend from the respective electrodes in order to permit external access to them. Finally, the housing is sealed to prevent the ingress of contaminants and the egress of the electrolyte.

Where the electrodes store charge in an EDL, the energy storage device is known as a "supercapacitor". Where one or more of the electrodes stores charge in an EDL and one or more electrodes stores charge by electrochemical reaction, this type of device is known as a "hybrid supercapacitor".

In other configurations, two or more of such cells are connected in parallel and/or series between the terminals to provide a desired operational voltage, current capacity, and/or capacitance. That is, the voltage that can be applied across a single cell is limited and, therefore, a plurality of cells are connected in series in higher voltage applications. For higher current applications, a plurality of cells are connected in parallel.

Frequently Employed Metrics

Operating Voltage Range: The breakdown voltages of the components (electrolyte salt, electrolyte solvent, electrode coating, current collector, separator, packaging) of the supercapacitor control the operating voltage range. Means to increase the operating voltage of the cell include using components with greater voltage stability. Known devices using non-aqueous solvents provide a means to increase the operating voltage of the cell. Further, as mentioned above, it is known to use a number of cells in series for higher voltage applications.

Capacitance: If uniform coatings are assumed, the capacitance (C) that is gained from a capacitor of the above type is proportional to the surface area (A) of the smallest electrode and inversely proportional to the distance between the electrodes (d). It is appreciated that capacitors may be formed in many arrangements, and that capacitance is measured for each electrically separate cell. Further, cells may be connected in series and/or parallel.

Energy Storage Capacity: The energy storage capacity for a capacitor is described by the following equation:

$$E = \frac{1}{2}CV^2 \qquad \text{Equation 1}$$

where E is the energy in Joules, C is the capacitance in Farads and V is the rated or operating voltage of the capacitor.

Power: Another measure of supercapacitor performance is the ability to store and release energy rapidly—this is the power, P, of a capacitor—which is given by:

$$P = \frac{V^2}{4R} \qquad \text{Equation 2}$$

where R is the internal resistance of the supercapacitor.

ESR: The internal resistance, R, is commonly referred to as the equivalent series resistance, or "ESR". That is, the ESR, is the sum of the resistance of all the components of the supercapacitor through which current flows between the external contacts or terminals. Further, the ESR of a device, or of an individual component of a device, is defined as the real component of the impedance at 1000 kHz.

Most importantly, as indicated above in Equation 2, the power performance of a supercapacitor is dependent upon the ESR. Further, A very significant contributor to a supercapacitor's ESR is the native oxide coating that forms on electrodes comprised of metals, such as aluminum. It is, therefore, appropriate to briefly discuss some characteristics of this significant impediment to reducing ESR—i.e., the native oxide layer:

The Native Oxide Layer

Formation: Even though aluminum has a very negative reduction potential relative to hydrogen ions, which generally implies a high reactivity, it is used in various applications because of the formation of a passivating surface layer—aluminum oxide. Typically, this "native" oxide is formed during the manufacturing process and subsequent storage of the aluminum.

Thickness and Variation of Thickness: FIG. 1 represents a schematic cross sectional illustration of a substrate 1 of aluminum that is used as an electrode in a supercapacitor. The substrate possesses a surface native oxide layer 2 that typically has an average thickness in the 4 nm to 10 nm range. Moreover, although layer 2's thickness varies uniformly in the schematic illustration of FIG. 1, it will be appreciated by those skilled in the art that the native oxide layer 2, in fact, varies both considerably and non-uniformly.

ESR: It is generally known that this 'native' oxide layer has a very high resistivity (☐) and that thinning the oxide layer is beneficial to reducing ESR. Accordingly, by increasing the oxide layer's thickness—without charging its chemistry—the ESR will tend to increase. Moreover, the ESR tends to increase during a supercapacitor's operation is at least partly due to an increase in the oxide's thickness.

Methods Employed to Reduce ESR

Conventional wisdom suggests that metal current collectors with thinner surface oxide layers, or non-metallic current collectors should be used to reduce the ESR of the supercapictor. Alternatively, increasing the geometric surface area (A) of the cell can reduce the ESR of the device, according to Equation 3.

$$R = \rho \frac{L}{A} \quad \text{Equation 3}$$

Any discussion of the prior art throughout the specification should in no way be considered as an admission that such prior art is widely known or forms part of common general knowledge in the field.

DISCLOSURE OF THE INVENTION

The preferred embodiments include a treated oxide layer have numerous benefits, including at least the following:

Resistivity: The treated layer demonstrates lower resistivity (☐) as compared to an untreated oxide layer. Thus, for similar thicknesses the treated layer has a lower resistance (R) than the untreated.

ESR: Further, this treated layer, when incorporated into energy storage devices yield significant ESR benefits—i.e., significantly lower ESR—both initially and with time.

Accordingly, the embodiments of the present invention allow, as alternatives:

a. The same ESR and power performance to be offered, but for this to be contained within a smaller overall package; or
b. The same volume packaging to provide improved ESR and power performance.

Operational Lifetime: A reduction in ESR is clearly advantageous for a number of reasons. First, it increases the operational lifetime of the supercapacitor. One of the measurements of performance of a supercapacitor is the ESR. If the ESR exceeds a predetermined value, the supercapacitor can be considered to have failed. By lowering the initial ESR and reducing the rate of increase in ESR with time (or "ESR rise rate") the period of time that the supercapacitor remains below the predetermined maximum limit for ESR can be significantly extended. Thus, the operational life is extended.

Power Dissipation: Reducing the ESR reduces the power dissipated as heat in overcoming the ESR while charging or discharging the cell. Power dissipation is a loss of efficiency; devices with lower power dissipation have potentially improved power and energy storage efficiency.

Reproducibility: The invention provides devices with lower ESR rise rates and with less variation in this rise rate than can be obtained from untreated current collectors, that are otherwise the same. The treatment therefore, permits more consistent reproducibility of ESR and ESR rise rates. In essence, this advantage is reflected in smaller variation in the ESR of devices with time, allowing devices to be operated closer to the optimum conditions.

Increased Power By Lowering ESR: The power generating capabilities of devices are increased when incorporating the invention—that is, as a consequence of the reduction in initial ESR, and ESR rise rates. As indicated by Equation 2, it is clear that any reduction in ESR provides an inversely proportional increase in the power that a device is able to deliver. Moreover, this power gain is achieved without having to increase the size of the energy device's packaging and, therefore, the power density of preferred devices are also increased (vis a vis corresponding prior art devices).

Increase Power By Operating at Higher Voltages: Power is also increased since the invention allows devices to reproducibly operate at higher voltages (vis a vis corresponding prior art devices): Again, as illustrated by Equation 2, the power capability of a capacitor is proportional to the square of the voltage. Accordingly, an increase in cell voltage from 2.3 Volts to 2.7 Volts—as is achieved by some of the preferred embodiments and exceeded by others—translates into a 38% increase in power. When this is coupled with a 10% decrease in ESR—again, as is achieved by some of the preferred embodiments and exceeded by others—a total power gain of over 50% is achieved.

It is an object of the invention, at least in the preferred embodiment, to overcome or substantially ameliorate at least one of the disadvantages of the prior art, or at least to provide a useful alternative.

According to a first aspect of the invention there is provided an electrode for an energy storage device, the electrode including:

a substrate of a metal that forms a native oxide layer; and a treated layer formed on the substrate from the native oxide layer, the treated layer having a resistance less than the resistance of the native oxide layer.

In a preferred form, the thickness of the treated layer is between between approximately 0.1 nm and 30 nm. Other preferred embodiments include a thickness between at least one of the following: about 0.3 nm and 20 nm; about 0.6 nm and 15 nm; about 1 nm and 10 nm; about 1.5 nm and 7 nm; about 1.8 nm and 6.3 nm; about 2.0 nm and 6 nm; about 2.5 nm and 5.5 nm; and, about 2.8 nm and 5.0 nm. Other embodiments may be thicker or thinner.

In a preferred embodiment, the treated layer includes a dopant. In one embodiment, the dopant is a fluoride. In other preferred embodiments the dopant includes at least one of the following:

1. Any element-other than oxygen and other than the principal component of the metal foil.
2. Any species that forms principally ionic bonds.
3. Any metal ion.
4. Any 'Transition Metal' (Groups 3–12, using IUPAC naming of the Periodic Table).
5. Any tetravalent ion (e.g. Si, Ge, Sn, Pb, Se, V, Cr, Mo, W, Mn, Ti, Zr, Hf, Ce, Pr, Tb).
6. Any tetravalent ion that forms principally ionic bonds (e.g. Sn, Pb, V, Cr, Mo, W, Mn, Ti, Zr, Hf, Ce, Pr, Tb).
7. Any element of Group 4 of the Periodic Table (e.g. Ti, Zr, Hf).
8. Zr or Ti.
9. Any Halide (e.g. F, Cl, Br, I, At).

In some preferred embodiments, the metal is a single metal; in other preferred embodiments it is a metal alloy. In some preferred embodiments, the metal is selected from the group consisting of: aluminium; nickel; copper; magnesium; titanium; tin; platinum; gold; silver; and any other metal that is able to be formed into a current collector for the energy storage device. In some embodiments, the current collector is an aluminum foil.

In a preferred embodiment, the electrode includes a coating that is applied to the treated layer. The coating is typically formed from one or more forms of carbon and a binder for adhering the carbon to itself and its associated current collector. Other materials can be used to provide an electrode with high surface area. More preferably, the coating includes a high surface area carbon, a highly conductive carbon, and a binder for retaining the coating in contact with the treated layer.

The coated treated foil can be used as an electrode in an electrochemical device. Some examples include: a capacitor, a supercapacitor, a hybrid supercapacitor, a battery, a fuel cell, a hybrid thereof, etc.

In a preferred form, the carbon coating has a thickness of about 0.5 micron to 150 microns. In other forms, its thickness is between 2 microns and 100 microns.

In a preferable form, the treated layer is formed by modifying the native oxide layer with one or more solutions. Some solutions contain an etchant; some contain one or more dopants. In a preferred form, such dopants include at least one of the following:

1. a halide.
2. a fluoride.
3. one element except the metal, and O.
4. at least one element—except the at least one metal is at least substantially without the at least one other substance, and O (when the metal is an alloy primarily comprised of the at least one metal and at least one other substance).
5. one species that forms principally ionic bonds.
6. one metal ion.
7. a "transition metal" from Groups 3–12 of the IUPAC Periodic Table.
8. one tetravalent ion wherein the tetravalent ion is at least one of Si, Ge, Sn, Pb, Se, V, Cr, Mo, W, Mn, Ti, Zr, Hf, Ce, Pr, and Tb.
9. one tetravalent ion that forms principally ionic bonds wherein the tetravalent ion that forms principally ionic bonds is at least one of Sn, Pb, V, Cr, Mo, W, Mn, Ti, Zr, Hf, Ce, Pr, and Tb.
10. one or more dopants include at least one element from Group 4 of the Periodic Table.
11. one of Ti, Zr, and Hf.

In a preferred form, the treated layer includes certain ranges of ratios of at least one of the following:

(a) Dopant to total oxygen
(b) Hydroxyl ion to total oxygen
(c) Fluorine ion to total oxygen According to a second aspect of the invention there is provided an electrode for an energy storage device, the electrode including:

a substrate of a metal that forms a native oxide layer; and
a treated layer formed on the substrate from the native oxide layer, the treated layer having a resistance that is less than the resistance of the native oxide layer, wherein the treated layer also includes a dopant. In a preferred form, such dopants include at least one of the following:

1. a halide.
2. a fluoride.
3. one element except the metal, and O.
4. at least one element—except the at least one metal at least substantially without the at least one other substance, and O (when the metal is an alloy primarily comprised of the at least one metal and at least one other substance).
5. one species that forms principally ionic bonds.
6. one metal ion.
7. a "transition metal" from Groups 3–12 of the IUPAC Periodic Table.
8. one tetravalent ion wherein the tetravalent ion is at least one of Si, Ge, Sn, Pb, Se, V, Cr, Mo, W, Mn, Ti, Zr, Hf, Ce, Pr, and Tb.
9. one tetravalent ion that forms principally ionic bonds wherein the tetravalent ion that forms principally ionic bonds is at least one of Sn, Pb, V, Cr, Mo, W, Mn, Ti, Zr, Hf, Ce, Pr, and Tb.
10. one or more dopants include at least one element from Group 4 of the Periodic Table.
11. one of Ti, Zr, and Hf.

In a preferred form the treated layer is thinner than a native layer of an oxide of that metal. However, in other embodiments the treated layer is thicker than, or alternatively substantially equal in thickness to, the native oxide layer.

Preferably, the electrode includes a carbon coating that is applied to the treated layer. More preferably, the carbon coating includes a high surface area carbon, a highly conductive carbon and a binder for retaining the coating in contact with the treated layer. However, the coating may be comprised of materials other than carbon, or including carbon.

In a preferred form, the treated layer is formed by etching the native oxide layer with an acid. In other preferred embodiments, the acid includes the dopant.

According to a third aspect of the invention there is provided an electrode for an energy storage device, the electrode including:

a substrate of a metal that forms a native oxide layer; and
a treated layer formed on the substrate from the native oxide layer, the treated layer providing a barrier property to the substrate that is greater than the corresponding barrier property provided by the native oxide layer.

Preferably, the barrier property improves resistance to attack of the substrate. For example, from attack a substance contained within the sealed packaging, or one that penetrates from the environment.

In some preferred embodiments, the device demonstrates at least one of the following: an initial ESR lower than for a similar device without a treated layer; a post-initial ESR less than for a similar device without the treated layer. Further, a preferable embodiment includes a treated layer with a dopant.

According to a fourth aspect of the invention there is provided an electrode for an energy storage device, the electrode including:

a substrate of a metal that forms a native oxide layer; and
a treated layer on the substrate that is formed from the native oxide layer and which includes a dopant for reducing the resistance of the native oxide layer.

In a preferred embodiment, the treated layer includes a dopant is a halide. Moreover, some embodiments make use of more than one dopant. Dopants include at least one of the following:

1. a halide.
1. a fluoride.
2. one element except the metal, and O.
3. at least one element—except the at least one metal at least substantially without the at least one other substance, and O (when the metal is an alloy primarily comprised of the at least one metal and at least one other substance).

4. one species that forms principally ionic bonds.
5. one metal ion.
6. a "transition metal" from Groups 3–12 of the IUPAC Periodic Table.
7. one tetravalent ion wherein the tetravalent ion is at least one of Si, Ge, Sn, Pb, Se, V, Cr, Mo, W, Mn, Ti, Zr, Hf, Ce, Pr, and Tb.
8. one tetravalent ion that forms principally ionic bonds wherein the tetravalent ion that forms principally ionic bonds is at least one of Sn, Pb, V, Cr, Mo, W, Mn, Ti, Zr, Hf, Ce, Pr, and Tb.
9. one or more dopants include at least one element from Group 4 of the Periodic Table.
10. one of Ti, Zr, and Hf.

In one embodiment, the treated layer has a density that is greater than the density of a native layer of an oxide of the metal. Further, the treated layer has a thickness that is less than the thickness of the native layer.

In another preferred form, the electrode includes a carbon coating that is applied to the treated layer. In some embodiments, the carbon coating includes a high surface area carbon, a highly conductive carbon and a binder for retaining the coating in contact with the treated layer.

In a preferred form, the treated layer is formed by etching the native oxide layer with an acid. In some preferred forms, the acid includes the dopant.

According to a fifth aspect of the invention there is provided an energy storage device including:

at least two electrodes, at least one of the at least two electrodes having a substrate of at least one metal that forms a native oxide layer;

at least one treated layer, the treated layer being a modified version of the native oxide layer.

Many other electrode configurations are possible, including stacked and rolled configurations. In some of those embodiments, the cells are connected in parallel with the terminals, while in other embodiments they are connected in series with each other between the terminals.

In a preferred embodiment, each electrode includes a carbon coating. Further, the energy storage device includes a separator within the housing for maintaining the electrodes in a spaced apart configuration and an electrolyte disposed within the housing. In further preferred embodiments, the energy storage device is a carbon double layer supercapacitor.

According to a sixth aspect of the invention there is provided an electrode for an energy storage device, the electrode including:

a substrate of a metal that forms a native oxide layer;

a treated layer formed on the substrate from the native oxide; and a high surface area layer being adhered to the treated layer wherein the adhesion force between the treated layer and the high surface area layer is greater than the adhesion force between a like high surface layer and the native oxide.

Preferably, the high surface area is a carbon particulate. In a preferred form, the carbon coating has a thickness of about 0.5 micron to 200 microns. In another preferred form, the coating has a thickness of about 2 micron to 100 microns. It will be evident to those skilled in the art that a wide range of coatings are employed in alternate embodiments.

In a preferred embodiment, the adhesion force between the treated layer and the high surface area layer is greater than the adhesion force between a like high surface layer and the native oxide.

According to a seventh aspect of the invention there is provided an energy storage device including:

a housing;

two electrodes disposed within the housing in an opposed and spaced apart configuration, wherein one of the electrodes has a predetermined geometric surface area;

two terminals that are connected to selected one or more of the electrodes and which extend from the housing for allowing external electrical connection to the electrodes.

In a preferred form, both electrodes have substantially similar predetermined geometric surface areas. In other forms, the electrodes have respective geometric surface areas that differ from one another. In other embodiments, the configuration is stacked, rolled, or takes on other configurations.

In a preferred form, the two or more electrodes are selected from the electrodes described above. In other forms, the electrodes each include at least one carbon layer on the treated layer. Even more preferably, the carbon layer includes a high surface area carbon, a conductive carbon, and a binder. In other embodiments, other coatings are employed; such as non-carbon coatings.

In a preferred form, the device includes a component that is disposed between each adjacent electrode to maintain the spaced apart configuration (or "separator").

Preferably also, the device includes an electrolyte that is disposed within the housing for allowing ionic conduction between the electrodes.

According to an eighth aspect of the invention there is provided an energy storage device having, when constructed, an initial ESR, the device including:

a housing;

two or more electrodes disposed within the housing in a spaced apart configuration for defining at least one energy storage cell;

two terminals that are connected to selected one or more of the electrodes and which extend from the housing for allowing external electrical connection to the electrodes; and, after 1000 hours, the device demonstrates a post-initial ESR less than for a similar device without the treated layer. In further embodiments, it also has an initial ESR lower than for a similar device without a treated layer.

According to a ninth aspect of the invention there is provided an energy storage device having, when constructed, an initial ESR, the device including:

a housing;

two or more electrodes disposed within the housing in a spaced apart configuration for defining at least one energy storage cell;

two terminals that are connected to selected one or more of the electrodes and which extend from the housing for allowing external electrical connection to the electrodes; and after 600 hours, the device demonstrates a post-initial ESR less than for a similar device without the treated layer. In other embodiments, it also has an initial ESR that is lower than for a similar device without a treated layer;

According to a tenth aspect of the invention there is provided an energy storage device having, when constructed, an initial ESR, the device including:

a housing;

two or more electrodes disposed within the housing in a spaced apart configuration for defining at least one energy storage cell;

two terminals that are connected to selected one or more of the electrodes and which extend from the housing for allowing external electrical connection to the electrodes, wherein the ESR of the device after 600 hours of operation at a predetermined cell voltage and temperature is less than about a similar device without a treated layer.

In a preferred embodiment, the two or more electrodes are selected from the electrodes described above.

In another, the device is a supercapacitor. Further, in some embodiments, the predetermined voltage is approximately 2.3 Volts.

According to an eleventh aspect of the invention there is provided an energy storage device including:

a housing;

two electrodes disposed within the housing in a spaced apart configuration, each electrode having a substrate of a metal that forms a native oxide layer, wherein the electrodes have been treated to modify the native layers to form respective treated layers;

two carbon coatings disposed on the respective treated layers;

a separator disposed within the housing for maintaining the spaced apart configuration;

an electrolyte for allowing ionic conduction between the coatings; and two terminals that are connected to the respective electrodes and which extend from the housing for allowing external electrical connection to the electrodes.

In some embodiments, the device includes more than two electrodes. Further, in some, each electrode is opposed to another electrode and connected to one of the terminals.

In other preferred embodiments, the device is a supercapacitor. In some preferred embodiments, and the operational voltage provided by the two electrodes is approximately equal to 2.3 Volts. In others, it may be at least in the 1 V to 3 V range.

In a preferred form, the native layers are modified chemically. That is, the chemical composition and one or more chemical properties of the native oxide layer are modified. In others, the native layers are modified chemically and physically. That is, in addition to the chemical change, there is a physical change to the native oxide layer. Examples of the latter include a change in resistance, physical structure, barrier properties, thickness, density, porosity uniformity, adhesion, etc. Even further, the chemical and/or physical modifications result in the treated layers having different electrical properties to the native oxide layers.

In a preferred form, the treated layers have an improved electrochemical stability such that the voltage stability of the device is improved.

Preferably also, the electrodes have been treated to modify the native layers to form respective treated layers such that the electrochemical stability of the device is improved. In addition, the treated layers offer improved protection of the substrate from reaction with contaminants. Alternatively, the treated layers offer improved protection of the substrate from reaction with water.

In a preferred form, the modification of the native layers includes etching those layers with an etchant. More preferably, the etchant includes a dopant that is incorporated into the native layer during the etching. In other embodiments, however, the modification of the native layers includes a further step, following the etching, to incorporate the dopant.

According to a twelfth aspect of the invention there is provided a method of manufacturing an electrode for an energy storage device, the method including;

providing a substrate of a metal that forms a native oxide layer; and modifying the native oxide layer of that metal to form a treated layer.

In some embodiments, the treated layer is thinner than the native oxide layer.

In a preferred form, the treated layer includes a dopant. In some, the dopant is an ionic species; in some, the ionic species is a fluoride.

In some embodiments, the treated layer is formed by etching the native oxide layer. In some, the etching is acid etching. In some, the acid includes a dopant that is incorporated into the treated layer during the etching process.

In a preferred embodiment, the acid includes hydrofluoric acid and the dopant is a fluoride.

In another preferred form, the dopant is selected from Group IV of the Periodic Table. In another, the dopant is selected from one or more of: titanium; and zirconium.

According, to a thirteenth aspect of the invention there is provided an energy storage device having, when constructed, an initial ESR, the device including:

a housing;

two or more electrodes disposed within the housing in a spaced apart configuration for defining at least one energy storage cell;

two terminals that are connected to selected one or more of the electrodes and which extend from the housing for allowing external electrical connection to the electrodes, wherein the ESR of the device after 200 hours of operation at a cell voltage of greater than 2.3 Volts is less than the initial ESR.

In some, the ESR of the device after 200 hours of operation is less than about 110% of the initial ESR. In others, the ESR of the device after 200 hours of operation is less than about 105% of the initial ESR.

According to a fourteenth aspect of the invention there is provided an energy storage device including:

a housing;

two or more electrodes disposed within the housing in a spaced apart configuration for defining at least one energy storage cell;

two terminals that are connected to selected one or more of the electrodes and which extend from the housing for allowing external electrical connection to the electrodes, wherein the rise rate of the ESR of the device after 200 hours of operation at a cell voltage of greater than 2.3 Volts is less than about 0.7 cm$^2$ per 100 hours.

According to a fifteenth aspect of the invention there is provided an energy storage device including:

a housing;

two or more electrodes disposed within the housing in a spaced apart configuration for defining at least one energy storage cell;

two terminals that are connected to selected one or more of the electrodes and which extend from the housing for allowing external electrical connection to the electrodes, wherein the initial ESR of the device is less than about 22 m$\Omega$.

According to a sixteenth aspect of the invention there is provided an energy storage device including:

a housing;

two or more electrodes disposed within the housing in a spaced apart configuration for defining at least one energy storage cell;

two terminals that are connected to selected one or more of the electrodes and which extend from the housing for allowing external electrical connection to the electrodes, wherein the ESR of the device after 200 hours of operation is less than 30 mΩ.

According to a seventeenth aspect of the invention there is provided an energy storage device including:
a housing;
two or more electrodes disposed within the housing in a spaced apart configuration for defining at least one energy storage cell;
two terminals that are connected to selected one or more of the electrodes and which extend from the housing for allowing external electrical connection to the electrodes, wherein the ESR of the device after 600 hours of operation is less than 30 mΩ.

According to an eighteenth aspect of the invention there is provided an energy storage device including:
a housing;
two or more electrodes disposed within the housing in a spaced apart configuration for defining at least one energy storage cell;
two terminals that are connected to selected one or more of the electrodes and which extend from the housing for allowing external electrical connection to the electrodes, wherein the ESR of the device after 1000 hours of operation is less than 30 mΩ.

According to an nineteenth aspect of the invention there is provided an electrode for an energy storage device, the electrode including:
a substrate of at least one metal that forms a native oxide layer; and
a treated layer formed on the substrate from the native oxide layer, the treated layer having a resistance that is less than the resistance of a native oxide layer.

According to an twentieth aspect of the invention there is provided an energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an initial ESR that is between approximately 0.7 Ω.cm² and approximately 0.6 Ω.cm².

According to an twenty-first aspect of the invention there is provided an energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an initial ESR that is between approximately 0.6 Ω.cm² and approximately 0.5 Ω.cm².

According to an twenty-second aspect of the invention there is provided an energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an initial ESR that is between approximately 0.5 Ω.cm² and approximately 0.4 Ω.cm².

According to an twenty-third aspect of the invention there is provided an energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an initial ESR that is between approximately 0.4 Ω.cm² and approximately 0.3 Ω.cm².

According to an twenty-fourth aspect of the invention there is provided an energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an initial ESR that is less than approximately 0.3 Ω.cm².

According to an twenty-fifth aspect of the invention there is provided an energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an ESR after 1000 hours of operation that is less than approximately 200% of an initial ESR of the device.

According to an twenty-sixth aspect of the invention there is provided an energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an ESR after 1000 hours of operation that is less than approximately 1.0 Ω.cm².

According to an twenty-seventh aspect of the invention there is provided an energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an ESR after 600 hours of operation that is less than approximately 200% of an initial ESR of the device.

According to an twenty-eighth aspect of the invention there is provided an energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an ESR after 600 hours of operation that is less than approximately 1.40 Ω.cm².

According to an twenty-ninth aspect of the invention there is provided an energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an ESR after 200 hours of operation that is less than approximately 200% of an initial ESR of the device.

According to an thirtieth aspect of the invention there is provided an energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an ESR after 200 hours of operation that is less than approximately 0.1.00 Ω.cm².

According to an thirty-first aspect of the invention there is provided an energy storage device including:

at least two electrodes, at least one of the at least two electrodes having a substrate of at least one metal that forms a native oxide layer;

at least one treated layer, the treated layer being a modified version of the native oxide layer.

According to an thirty-second aspect of the invention there is provided a low resistance metal, including:

a substrate of at least one metal that forms a native oxide layer; and a treated layer formed on the substrate from the native oxide layer, the treated layer having a resistance that is less than the resistance of a native oxide layer.

PREFERRED EMBODIMENTS OF THE INVENTION

The Treatment Process

Figure 1:
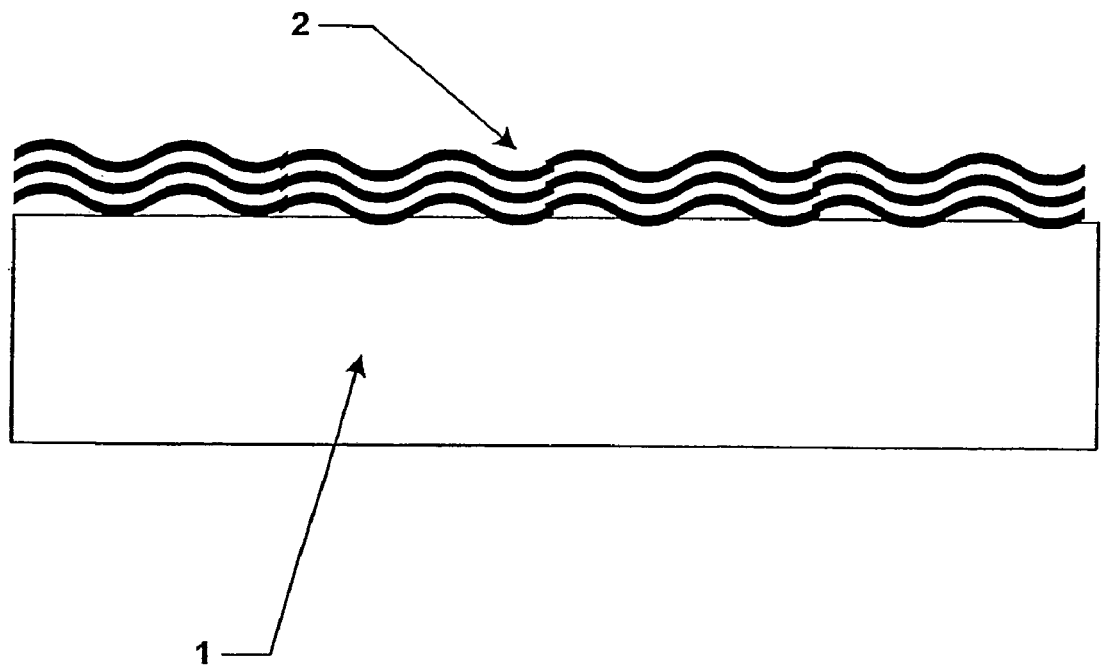
FIG. 1 is a schematic cross sectional view of a substrate of aluminium having a native oxide layer.

The treatment process in accordance with the invention will now be described in general. In essence, the foil is treated to obtain a treated layer having at least one of the following: an initial resistance less than the native oxide layer, a resistance rise rate that is lower than that of the native oxide layer. The Resistance of a system is referred to as the Equivalent Series Resistance (ESR) and is defined as having the units of measurement ohm-square-centimeters ($\Omega.cm^2$). The Resistivity ($\rho$) of the treated layer is defined by:

$$\rho = R\frac{A}{d}$$

Where R is the Resistance (in $\Omega.m^2$), d is the thickness (in meters) of the layer and A is the area (in square meters) of the layer at a normal to d. The units of Resistivity are ohm-meters ($\Omega.m$).

A preferred treatment process in accordance with the invention involves treating metal foil, such as aluminum, with two treatment solutions in a two step (or "treatments") process to obtain a treated layer. In a preferred embodiment, the treated layer includes one or more dopants. However, it will be obvious to those skilled in the art that more or less than two solutions is used in some alternate embodiments. It will also be obvious based on the teachings herein that more or less than two steps can be utilized. For instance, it will be obvious some embodiments rely on a single solution in a single step. Further, in a preferred embodiment, the treatments described are carried out under ambient conditions; however, it will be evident to those skilled in the art that the treatments are performed at other temperatures and/or pressures in other embodiments.

Further, an embodiment of the invention involves treating the foil in a first treatment solution that fully, or alternatively partially, removes the native oxide layer. The treatment with this first solution results in a replacement layer that contains one or more dopants (M) incorporated from the solution.

The preferred embodiment further includes, subsequent to this first treatment step, treating the foil to neutralize or remove any excess treatment solution, preferably with water. Further, the foil is dried before and after the rinsing in some embodiments. However, in other embodiments, it is not dried at these junctions, or not at all. Ultimately, the resulting treated layer has a lower Resistance (R) than the untreated 'native' oxide.

In a preferred embodiment, the treatment process involves a subsequent, or alternatively a concurrent treatment, with a second treatment solution different from the first solution. However, in other embodiments the same treatment solution is used. In a preferred embodiment, the second treatment partially, and in other embodiments fully, removes the doped oxide layer formed by the first treatment. Further, in a preferred embodiment, treatment with the second treatment solution results in a layer that contains one or more dopants incorporated from the solution.

Subsequent to this second treatment, the treated foil is rinsed to neutralize or remove any excess treatment solution in a preferred embodiment. After rinsing, the foil is also dried in a preferred embodiment.

The treated layer obtained from the second treatment, in a preferred embodiment, demonstrates a smaller change in Resistance (R) when exposed to chemical or electrochemical environments—as compared with the native oxide layer. The treated layer obtained from the second treatment also has a lower Resistance (R) than the untreated 'native' oxide.

It will be obvious to those skilled in the art that numerous combinations of these treatment solutions and numerous combinations of treatment steps may be used. For example: an individual treatment may be used (either treatment solution one or treatment solution two); treatment two may occur before treatment one; and more than two treatments may be used; and treatments may be repeated, etc.

The treatment solutions are described in more detail below:

Treatment One

As stated above, in a preferred embodiment, the treatment partially, or alternatively fully, removes the 'native' oxide layer (nominally $Al_2O_3$ when aluminum foil is used) from the foil. Further, in a preferred embodiment, a treated layer is created which incorporates a dopant. In other embodiments, treatment one does not produce a doped layer. Further, the treatment preferably removes any impurities from the surface of the foil. However, in other embodiments, impurities are not removed.

The treatment solution of a preferable embodiment, but not in all embodiments, contains an acid. The acid includes Hydrofluoric (HF) in a preferred embodiment; but includes at least one of the following in other preferred embodiments: sulfuric ($H_2SO_4$), phosphoric ($H_3PO_4$), nitric ($HNO_3$), hydrochloric (HCl), and an organic carboxylic acid. For example, one embodiment contains less than 10% Hydrofluoric acid (HF), less than 30% Sulfuric acid ($H_2SO_4$) and less than 20% surfactant. In another embodiment, the first treatment solution contains between 0.01% and 5% HF, between 1% and 15% $H_2SO_4$, and between 1% and 10% surfactant. In another embodiment, the first treatment solution contains between 0.1% and 3% HF, between 1% and 8% $H_2SO_4$ and between 1% and 10% surfactant. In another embodiment, the first treatment solution contains between 0.4% and 2% HF, between 2% and 6% $H_2SO_4$ and between 1% and 10% surfactant. As it will be evident from the teachings of this document, additives known to those skilled in the art are added in some embodiments to aid these processes (e.g., surfactants and metal sequestering agents). For example, additives include those that aid the removal of the "native" oxide layer, aid the removal of impurities, etc. Further, other acids, elements, and compounds are used in other embodiments; and, such alternatives will be known to those skilled in the art.

As a consequence of treatment with this solution a treated layer is formed in place of, or in addition to, the 'native' oxide layer. In a preferred embodiment, the treated layer contains one or more dopants incorporated from the solution. For example, when Hydrofluoric acid is used, the dopant incorporated during the treatment with HF is fluorine (F).

Moreover, the treatment one can be accomplished in a medium other than a solution, and by techniques other than acid. For example, partial, or alternatively total, removal of the natives oxide layer is accomplished in other embodiments by various techniques including radio frequency sputtering, laser ablation, ion-beam impact, etc. Other options will be known to those skilled in the art.

Treatment Two

In a preferred embodiment, treatment two involves a solution which dopes the layer that was formed as a consequence of the first treatment; that is, a solution with one or more dopants (M). In some embodiments, the second treatment partially, or alternatively fully, removes the treated layer formed in the first treatment step. In other embodiments, it does not.

As a consequence of the second treatment, a dopant, or alternatively two or more dopants, are incorporated into the treated layer. It is thought that the treated layer is a metal oxide/hydroxide containing the dopant or dopants, and may be formed in addition to, or in place of, the layer formed by the first treatment.

It will also be clear to those skilled in the art based on the teachings herein that the dopant is at least one, or alternatively more than one, species that belongs to one or more of the following:

1. Any element other than oxygen and other than the principal component of the metal foil. By principal component it is meant the chemical element that constitutes the majority of the foil in cases where the foil is not chemically pure.
2. Any species that forms principally ionic bonds.
3. Any metal ion.
4. Any 'Transition Metal' (Groups 3–12, using IUPAC naming of the Periodic Table).
5. Any tetravalent ion (e.g. Si, Ge, Sn, Pb, Se, V, Cr, Mo, W, Mn, Ti, Zr, Hf, Ce, Pr, Tb).
6. Any tetravalent ion that forms principally ionic bonds (e.g. Sn, Pb, V, Cr, Mo, W, Mn, Ti, Zr, Hf, Ce, Pr, Tb).
7. Any element of Group 4 of the Periodic Table (e.g. Ti, Zr, Hf).
8. Zr or Ti.
9. Any Halide (e.g. F, Cl, Br, I, At).
10. Fluorine (F).

In one embodiment, the second treatment solution contains less than 10% Hydrofluoric acid (H F) and between 0.01% and 20% dopant, where the dopant is Zirconium (Zr) and/or Titanium (Ti). In another embodiment, the solution contains less than 5% HF and between 0.02% and 10% dopant, where the dopant is Zirconium (Zr) and/or Titanium (Ti). In a further embodiment, the solution contains less than 1% HF and between 0.02% and 10% dopant, where the dopant is Zirconium (Zr) and/or Titanium (Ti). Further, in another embodiment, the solution contains less than 1% HF and between 0.05% and 2% dopant, where the dopant is Zirconium (Zr) and/or Titanium (Ti). Even further, in other embodiments, the solution contains less than 1% HF and contains 0.5% dopant (M), where M is Zirconium (Zr).

Manufacturing Apparatus of the Invention

Figure 3:
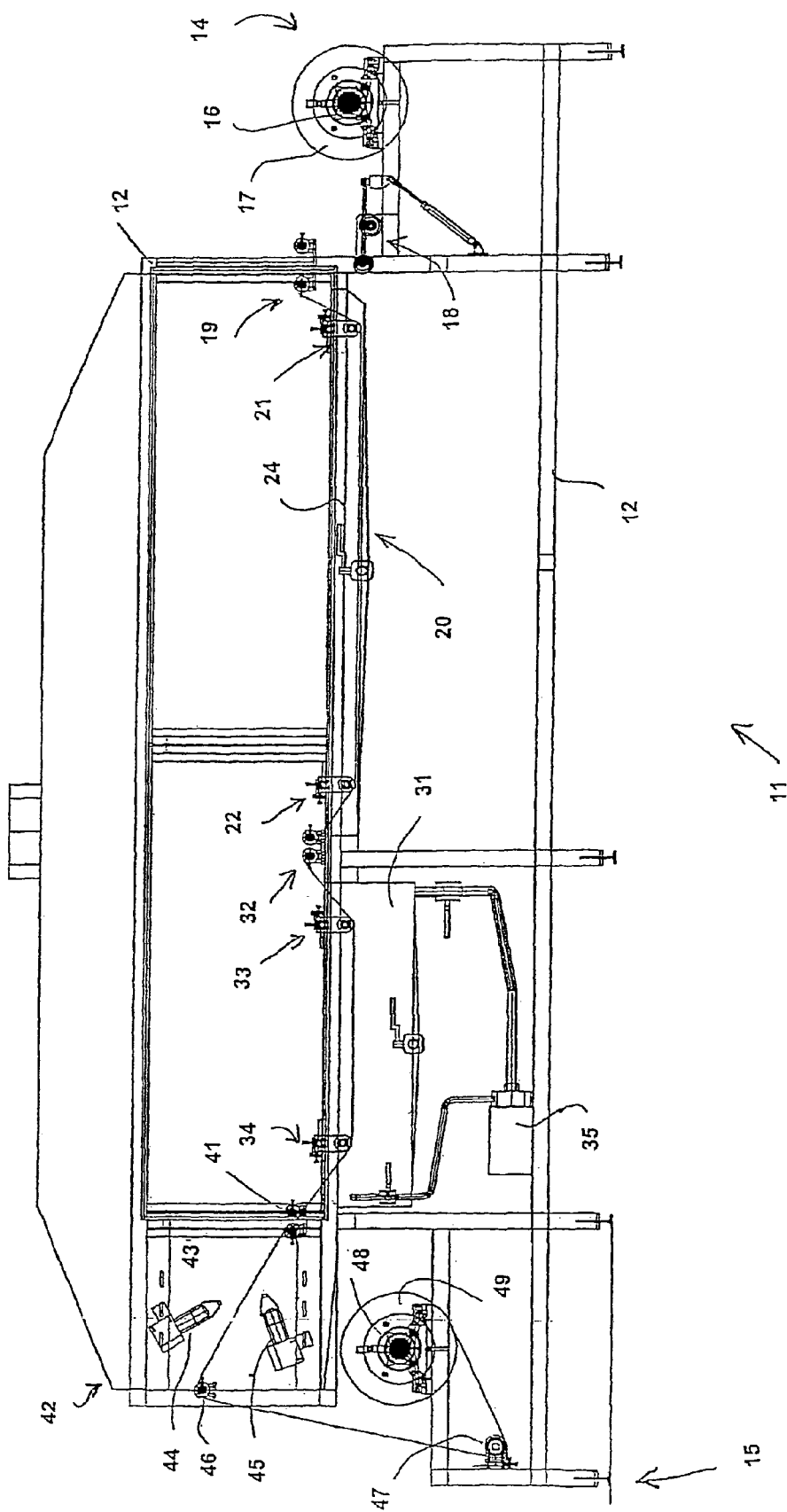
FIG. 3 is a schematic side view of an apparatus for treating a continuous metal sheet in accordance with the invention.

As shown in FIG. 3, there includes a manufacturing apparatus 11.

Apparatus 11 embodies a single treatment process, however, it is understood that any number of the components of the apparatus can be combined in alternate combinations—including repeated use of similar components for example—to enable two or more treatment steps. In addition, although a number of specific parts/steps are given separate numbering, there is no intention to suggest that these parts/steps are, or are not, more important than the sub-parts/sub-steps. Further, it will be obvious to those skilled in the art that other embodiments involve alternative parts/steps, additional parts/steps, less parts/steps, repeated use of similar or identical parts/steps, etc.

The apparatus has the following components/pieces:

1. A frame: A frame 12 extending between the two ends 14 and 15, supporting a treatment station 20 and a rinse/neutralization station 31.
2. A Foil control system: As seen in FIG. 3, the feed spool 16 receives a spiral wound reel 17 of metal foil. In this embodiment, spool 16 is lightly friction-braked, while in other embodiments, it is positively driven by a motor (not shown)

The foil is passed over a series of rolls 18, 19, 21, 22, 32, 33, 34, 41, 46 and 47 mounted to frame 12 that guide and tension the foil into baths 20 and 31 and onto an output spool 48. Spool 48 is driven by an electric motor (not shown) to spiral wind the foil onto a treated reel 49. The motor is controlled to ensure the foil is advanced at an instant velocity through the treatment process. However, it will be apparent to those skilled in the art that other ways of manoeuvring the foil may be used, and other ways of treating the foil may be employed.

The foil is comprised of a metal. In some embodiments, the metal is a single metal, and alternatively is a metal alloy. In a preferred embodiment, the metal is at least one from the group consisting of: aluminium; nickel; copper; magnesium; titanium; tin; platinum; gold; silver; and any other metal that is able to be formed into a current collector for the energy storage device. In this embodiment the foil is aluminium.

3. A fume hood: A fume hood 42 for ensuring that any vapours or fumes generated during the treatment are safely removed.

4. Treatment bath: Bath 20 contains a treatment solution. In a preferred embodiment 100 litres of treatment solution is used. The treatment solution is circulated by pump (not shown in FIG. 3) at about 10 litres per minute and replenished when the treatment solution is considered spent. Line 24 represents the fluid level. Rolls 21 and 22 maintain the foil below the fluid level 24 and ensure that the length of foil in the bath at any one time is known. The contact time can be accurately controlled by appropriately setting the foil's travel speed through bath 20. In this embodiment, the contact time is 1 minute. However, in other embodiments, the contact time may range from 15 seconds to 6 minutes. Other times will be readily known to those skilled in the art.

5. Cleansing Bath: In a preferred embodiment, there is a cleaning step. Specifically, the foil, upon exiting bath 20, is feed through a pair of tensioning rollers 32 and into a second fluid bath 31. In some embodiments, rollers 32 are preceded by an adjacent scraper (not shown) to minimize contamination of the cleansing fluid. The foil is maintained submerged in bath 31 by rollers 33 and 34.

In the present embodiment, bath 31 includes 40 litres of de-ionised water for cleansing the foil of any residual solution from bath 20. The water is circulated by pump at about 2 litres per minute and replenished when the conductivity of the water exceeds 200 μS/cm. In other embodiments, different cleansing fluids and flow rates are used. After exiting bath 31, the foil is fed through tensioning roller pair 41. In some embodiments these rollers are preceded by an adjacent scraper (not shown) to physically remove some of the cleansing fluid from the foil. In other embodiments, spray rinsing is used instead of a rinsing bath. It will be obvious to those skilled in the art that still further rinsing techniques may be used. In multi-step processes where there are two or more treatment steps, there is preferably a cleaning step between the treatment steps to minimize the contamination of one treatment solution with another treatment solution.

6. Drying Chamber: Drying Chamber 42 is adjacent to roller pair 41, and has a cavity 43 and a plurality of spaced apart heat guns 44 and 45 mounted on opposite sides of chamber 42. The chamber also houses a device that directs a stream of air or nitrogen gas over the foil to blow off any excess rinse/neutralization fluid (not shown in FIG. 3). A device is located on either side of the foil and positioned to direct the gas streams in such a manner as to remove the excess fluid on the foil between roller pair 41 and direct this fluid back into the rinse/neutralization bath. The foil enters the chamber after leaving roller pair 41 and is drawn through the chamber and over a roller 46 that is on the opposite side of the chamber to that roller pair. In some embodiments involving multi-step processes, where there are two or more treatment steps, there may be a drying step between the treatment steps.

7. Heat Guns: Heat guns are angled to direct respective heated airflows toward the opposite faces of the foil. The airflows are counter to the direction of foil travel. The heat guns used in this embodiment are manufactured by Leister and marked as model Lufterhitzer Type 3300. In other embodiments, use is made of different heat guns. Moreover, in alternative embodiments, other heating elements, such as infrared sources, are used.

The heated air is directed toward the foil to ensure that excess fluid is removed from the foil. The heating capacity required is determined by the amount of fluid that the foil retains, the boiling point of the fluid, the speed of progression of the foil, and the number and configuration of the heat guns. In the case of de-ionized water, the air temperature at the foil surface is regulated to 90° C. Many other appropriate drying methods will be apparent to those skilled in the art.

Additional Information Regarding the Implementation of the Apparatus

It will be appreciated that the term bath used in the following implementation section also includes associated guide and tension rolls in, and adjacent to, the bath. When a single treatment solution is used, apparatus 11 may be utilized as depicted in FIG. 3 and described above. That is, a single treatment bath 20 is followed by a single cleansing bath 31 located between the foil delivery system and the drying chamber 43. In this embodiment, the preferred treatment solution is in bath 20 and the rinse/neutralisation solution in bath 31. The foil first passes through bath 20 then bath 31 before entering the drying chamber 43. When two treatment solutions are used, two treatment-cleansing bath pairs (20 and 31) are arranged consecutively. That is, there is a bath 20, followed by bath 31, followed by a bath equivalent to 20 (20a), followed by a bath equivalent to 31 (31a). This sequence of baths is located between the foil delivery system and the drying chamber 43 with bath 31a adjacent to the drying chamber. In this embodiment a treatment solution is placed in the first bath 20 and a treatment solution is placed in 20a. Rinse/neutralisation solutions are placed in the two baths 31 and 31a.

As stated above, the foil passes through the first treatment bath 20, is cleaned in the first cleansing bath 31, before passing through the second treatment bath 20a, and finally passing through the second cleansing bath 31a before entering the drying chamber. In some embodiments, more than two treatment solutions may be used in a single bath. It will be appreciated that in some embodiments it is possible to have a sequence of more than two treatment and cleansing baths (20 and 20a; and 31 and 31a). It will also be appreciated that in some embodiments, either one or both of the cleansing baths located between the treatment baths may be omitted.

Examples of Treatment Solutions

It will be clear to those skilled in the art and based on the teachings herein that many different solutions can be used as the first and as the second treatment solutions. These examples represent various embodiments, but are not intended to be limiting, as many other possibilities exist.

Examples of First Treatment Solutions

1) Product A—"Metall Etch 291L", manufactured by Chemetall GmbH (Germany) and having a nominal composition as declared by the manufacturer of:

| Sulphuric acid: | 10–30% |
| --- | --- |
| Hydrofluoric acid: | 10% |
| Surfactant: | 1–10% |
| Water and others: | balance |

The inventor's analysis shows that Product A contains 15% Sulphuric acid ($H_2SO_4$).

2) Product B—"Novox LF", manufactured by Henkel Group (Germany) and having a nominal composition as declared by the manufacturer of:

| Sulphuric acid: | 15% |
| --- | --- |
| Hydrofluoric acid: | 8% |
| Surfactant: | <10% |
| Ethylene glycol ethyl ether: | <10% |
| Water and others: | balance |

Examples of Second Treatment Solution

1) Product C—"Okemcoat 4500", manufactured by Chemetall GmbH (Germany) and having a nominal composition as declared by the manufacturer of:

| Hydrofluoric acid: | 1–10% |
| --- | --- |
| Water and others: | balance |

The inventor's analysis shows that Product C contains 0.7% Zirconium (Zr). The manufacturer recommends using Product A prior to treatment with Product C.

2) Product D—"Alodine 4830", manufactured by Henkel Group (Germany). The manufacturer recommends using Product D in combination with Product E in a single mixed solution treatment, with a volume ratio ('D' to 'E') of 1.2:1. Product D has a nominal composition as declared by the manufacturer of:

| Hydrofluoric acid: | <1% |
| --- | --- |
| Polyacrylic acid: | <10% |
| Water: | balance |

The manufacturer recommends using Product B prior to treatment with Product D.

3) Product E—"Alodine 4831", manufactured by Henkel Group (Germany). The manufacturer recommends using Product E in combination with Product D in a single mixed solution treatment, with a volume ratio ('D' to 'E') of 1.2:1. Product E has a nominal composition as declared by the manufacturer of:

| Hydrofluoric zirconic acid: | 7% |
| --- | --- |
| Hydrofluoric acid: | trace |

The inventor's analysis shows that Product E contains 3.2% Zirconium (Zr). The manufacturer recommends using Product B prior to treatment with Product E.

4) Product F—"Alodine 5200", manufactured by Henkel Group (Germany) and having a nominal composition as declared by the manufacturer of:

| Hydrofluoric acid: | 1% |
| --- | --- |

The inventor's analysis shows that Product E contains 0.15% Zirconium (Zr) and 0.53% Titanium (Zr). The manufacturer recommends using Product B prior to treatment with Product F.

5) Product G—"Gardobond 4707A", manufactured by Chemetall GmbH (Germany) and having a nominal composition as declared by the manufacturer of:

| Hydrofluoric titanic acid: | <10% |
| --- | --- |
| Hydrofluoric acid: | <1% |

The inventor's analysis shows that Product E contains 0.23% Zirconium (Zr) and 0.59% Titanium (Zr). The manufacturer recommends using Product A prior to treatment with Product G.

An Example of a Standard Supercapacitor

Figure 4:
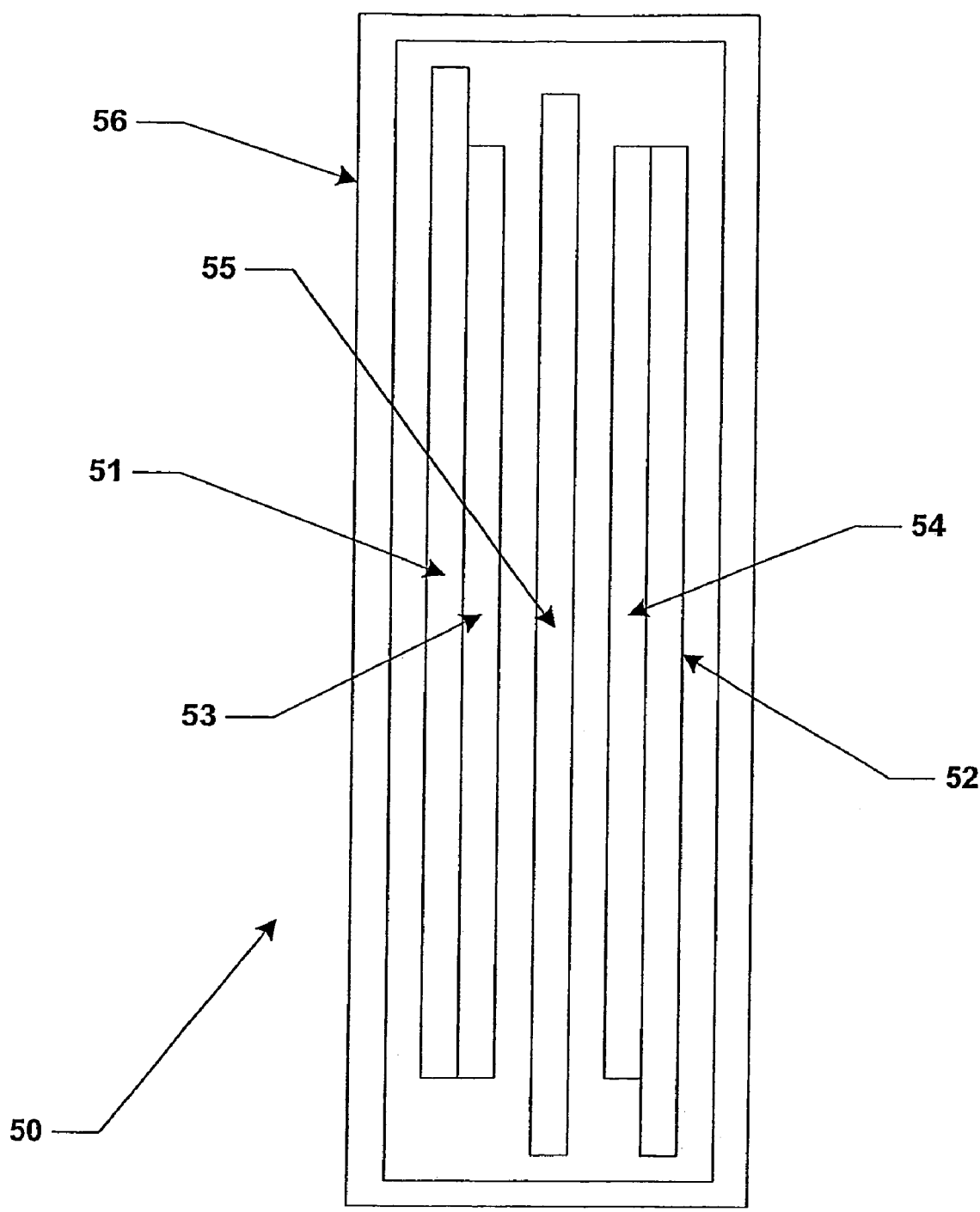
FIG. 4 is a schematic side view of a supercapacitor constructed in accordance with the invention.

By way of example, reference is now made to FIG. 4 where there is schematically illustrated a supercapacitor 50 constructed in accordance with the invention. The results that follow in subsequent portions of this document reflect such a supercapacitor. It will be, however, obvious to those skilled in the art that the capacitor below can be modified in various ways—e.g., less components, other components, additional components, etc.—in other embodiments. Further, the various components listed below are packaged within a sealed housing 56.

Electrodes: The supercapacitor includes two electrodes that form a single capacitive cell. These electrodes include current, collectors 51 and 52 that are cut from the treated foil invention. The two electrodes also include respective carbon coatings 53 and 54 in a preferred embodiment. Other coatings, or alternatively no coating, can be applied to the treated foil to form each of, or alternatively one of, the electrodes. As shown in FIG. 4, the electrodes are opposed and maintained in a spaced apart relationship, having a separator 55 between them. In other embodiments the electrodes are stacked so that more than one cell is contained within housing 56 in a stacked configuration. In further embodiments two or more electrodes are rolled and contained within a housing.

Terminals: Current collectors 51 and 52 are connected to respective terminals (not shown) that extend through housing 56 to allow external electrical connection with the electrodes. However, many other electrode configurations are possible, including stacked and rolled configurations. In some embodiments, the cells are connected in parallel with the terminals; while in other embodiments, they are connected in series with each other between the terminals.

An Electrolyte: Housing 56 also includes an electrolyte for allowing ionic conduction between the electrodes and in particular between the coatings 53 and 54. Expressed in a slightly different way, the space between and the electrodes, and within the voids of the electrode coatins, and within the micropores of the materials that form the coating, contain a solvent with charged species in it in a preferred embodiment. In a preferred embodiment, the solvent is a liquid and the source of charged species is a salt. In other embodiments, the electrolyte solvent may be a solid and the charged species are ions.

In a preferred embodiment, the salt is a source of ions that form a double layer on the surface of the carbon, providing a capacitance. In a preferred embodiment, the electrolyte solvent is acetonitrile (AN) and the salt is Tetra-Ethyl-Ammonium-Tetra-Fluoro-Borate (TEATFB) having a conductivity of 54 mS.cm$^{-1}$. Other solvents and other charged species are obvious to those skilled in the art, and the preferred embodiment is not meant to be limiting in any way.

A Separator: In a preferred embodiment, separator 55 is a contiguous or non-contiguous component employed to physically isolate the carbon coatings 53 and 54 from each other to prevent electrical shorting of the two electrodes. The separator is a separate component, or alternatively included as part of either one or both electrodes and/or the electrolyte. In a preferred embodiment, the separator is a 50 μm thick Poly-Ethylene-Terephtalate (PET) porous membrane. Other possible separators will be obvious to those skilled in the art.

Coating: The treated foil is used in an electrochemical device (capacitor, supercapacitor, hybrid supercapacitor, battery, fuel cell, a hybrid thereof, etc.) preferably, but not necessarily, with a coating applied to the foil. In a preferred embodiment, the electrodes 51 and 52 that are contained within supercapacitor 50 include respective carbon coatings 53 and 54. The coating is preferably, but not necessarily in all embodiments, formed from one or more forms of carbon and a binder for adhering the carbon to itself and the treated foil.

Other materials can be used to provide the electrodes with a high surface area, such as organic molecules (polymers), inorganic compounds (metal oxides, metal hydroxides, metal phosphates). Further, other coatings will be known to those skilled in the art. In other embodiments, use is made of other high surface area materials, including at least one of: carbon nanotubes; carbon fibrils; aerated gels; conductive polymers; other forms of carbon substances; etc. By "high surface area" it is meant that the component has a surface area many times that of the geometric surface area of the electrode. Moreover, other materials can be used that react electrochemically with the electrolyte in the cell, carbons (graphite, nanotubes, Buckyballs), organic molecules (polymers) and inorganic compounds (metal oxides, metal hydroxides, metal phosphates).

In a preferred embodiment, the Carbon mix coating is comprised of a high surface area carbon base, a highly conductive carbon, and a binder.

Geometric Areas of the Coating: The coatings 53 and 54 have respective geometric areas, which should not be confused with the surface area that these coatings provide. The supercapacitor 50 has an overall Equivalent Series Resistance (ESR), expressed in terms of the geometric area and having units of ohm square centimetres (Ω.cm$^2$). The ESR of the supercapacitor is determined from the geometric area of the electrode with the smallest geometric area.

In this embodiment, both electrodes have the same predetermined geometric surface area. In other embodiments, however, the electrodes have respective geometric surface areas that differ from one another.

Tests Related to at Least Some of the Characteristics of the Treated Layer

Figure 2:
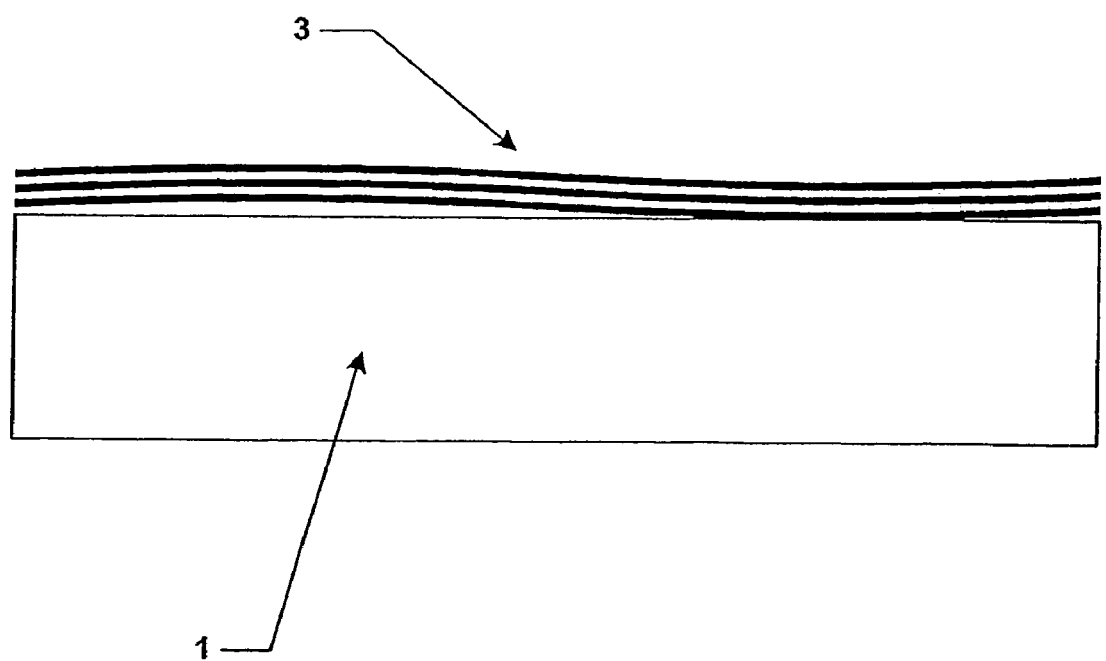
FIG. 2 is a schematic cross sectional view of a substrate of aluminium having a native oxide layer that has been modified in accordance with one embodiment of the invention to form a treated layer.

FIG. 2 shows, in schematic illustration, the substrate 1 of FIG. 1 following treatment in accordance with an embodiment of the invention's treatment process described above. It will be appreciated that layer 2 of FIG. 1 has been modified chemically and/or physically to form a treated layer 3 shown in FIG. 2. Further, it will be evident to those skilled in the art that in other embodiments the treated layer is at least one of: chemically modified, physically modified, and modified in other ways.

Test Results Relating to the Treated Layer's Thickness

X-ray Photoelectron Spectroscopy (XPS) was employed to provide insight into the chemical composition and physical characteristics of the treated layer of the invention, and how the treated layer differs from the 'native' oxide layer. For instance, the XPS data provides insight into the thickness of the treated layer.

Reference is now made to Table 2. More specifically, this Table illustrates the results of the XPS analysis of the thickness of the oxide layers on aluminum foils. The oxide thickness was estimated using the formula below, which is derived from the Lambert-Beer law of exponential attenuation of the photoelectron signal in solid matter. That is:

$$d_{Alox} = (\lambda_{Al}/\cos \Theta) \ln(1 + 1.341 I_{Al}^{3+}/I_{Al}^{0})$$

Further, the terms in the equation are:
- $d_{Alox}$ = Thickness of oxidized Al surface layer (in nm = $10^{-9}$ m)
- $\Theta$ = Angle of emission with respect to the surface normal (0°)
- $\lambda_{Al}$ = 2.8 nm (inelastic mean free path of Al 2p photoelectrons in $Al_2O_3$, which is taken from NIST Standard Reference Database 71: Electron Inelastic-Mean-Free Path Database, version 1.1, U.S. Dept. of Commerce, National Institute of Standards and Technology, Gaithersburg, Md., U.S.A. 2000)
- $I_{Al}^{3+}$ = The intensity of the oxidized Al peak (Binding Energy of around 75 eV)
- $I_{Al}^{0}$ = The intensity of the Al metal peak (Binding Energy of around 72 eV).

TABLE 2

Results of XPS Analysis

| First Treatment | Second Treatment | 'Shiny' Side Thickness of Oxide (nm) | 'Dull' Side Thickness of Oxide (nm) |
| --- | --- | --- | --- |
| None | None | 5.4 | 5.1 |
| Product A (5%) | None | 3.0 | 3.4 |
| Product B (5%) | None | 3.6 | 4.1 |
| Product A (5%) | Product C (2.5%) | 2.8 | 3.1 |
| Product B (5%) | Products D + E (1.5%) | 3.8 | 3.5 |
| Product B (5%) | Product F (1.5%) | 3.5 | 3.4 |

Table 2 shows that the thickness of the treated layer is lower than that of the untreated 'native' oxide layer. (It is common for aluminum foils to have dissimilar faces; one "shiny" and the other "dull".) It also shows that there is no systematic difference in the thickness between the two treated sides.

Test Results Relating to the Treated Layer's Composition

Table 3 provides the ratio of atom percentage data derived from XPS spectra for a number of foils having surface treatments, with the untreated foil being provided as a reference. The ratio of atom percentages relative to inorganic oxygen is employed for the descriptive data because it is the least affected method when surface contamination disrupts the actual atom percentage measurements. Oxygen was chosen because it is always the largest component of the treated layer and therefore the ratio will then be less than one.

TABLE 3

XPS analysis comparing the chemical composition of treated and untreated aluminum foils

| First Treatment | Second Treatment | Peak | Shiny Side | Dull Side |
|---|---|---|---|---|
| None | None | Inorganic O | 1.000 | 1.000 |
| | | Al metal | 0.094 | 0.110 |
| | | Al oxide | 0.405 | 0.422 |
| | | F | 0.000 | 0.000 |
| Product A (5%) | None | Inorganic O | 1.000 | 1.000 |
| | | Al metal | 0.190 | 0.153 |
| | | Al oxide | 0.274 | 0.272 |
| | | F | 0.178 | 0.183 |
| Product B (5%) | None | Inorganic O | 1.000 | 1.000 |
| | | Al metal | 0.189 | 0.146 |
| | | Al oxide | 0.368 | 0.356 |
| | | F | 0.167 | 0.118 |
| Product A (5%) | Product C (2.5%) | Inorganic O | 1.000 | 1.000 |
| | | Al metal | 0.313 | 0.195 |
| | | Al oxide | 0.391 | 0.300 |
| | | F | 0.212 | 0.145 |
| | | Zr | 0.028 | 0.032 |
| Product B (5%) | Product D (1.5%) | Inorganic O | 1.000 | 1.000 |
| | | Al metal | 0.050 | 0.040 |
| | | Al oxide | 0.310 | 0.329 |
| | | F | 0.039 | 0.044 |
| Product B (5%) | Products D + E (1.5%) | Inorganic O | 1.000 | 1.000 |
| | | Al metal | 0.200 | 0.221 |
| | | Al oxide | 0.423 | 0.415 |
| | | F | 0.055 | 0.080 |
| | | Zr | 0.018 | 0.015 |
| Product B (5%) | Product F (1.5%) | Inorganic O | 1.000 | 1.000 |
| | | Al metal | 0.163 | 0.236 |
| | | Al oxide | 0.310 | 0.423 |
| | | F | 0.077 | 0.139 |
| | | Zr | 0.007 | 0.003 |
| | | Ti | 0.026 | 0.007 |

Table 3 shows that via a first treatment, Products A and B each respectfully incorporate Fluorine (F) into the treated layer. Additionally, via a second treatment, Products C through F incorporate Zirconium and/or Titanium into the treated layer. Table 3 therefore also shows that there is no systematic difference in the composition between the two treated sides.

In addition to identifying the presence of dopants, the XPS data allows the determination of the ratio of oxygen present as Aluminum Hydroxide (Al—O—H). Table 4 gives results for five similar aluminum foils treated with a 5% solution of Product A. Table 5 gives results for three different thicknesses of foil treated with a 5% solution of Product A. These tests, and all others, except the tests reflected in Table 4 (in which foil # 4 is Neher foil), were performed with foil manufactured by Neher of Switzerland [Lawson Mardo Singen is apparently Neher's parent company], and it is 20 μm unless otherwise stated.

Careful examination of XPS data allows the distinction of various species in the layer. Further, It will be apparent to those skilled in the art based on the teachings herein that additional ratios are achievable.

TABLE 4

XPS analysis comparing the chemical composition of treated and untreated aluminum foils from different sources

| | Treated | | | Untreated | | |
|---|---|---|---|---|---|---|
| Foil | Surface Layer Thickness (nm) | OH | F | Surface Layer Thickness (nm) | OH | F |
| 1 | 3.5 | 0.67 | 0.12 | 4.4 | 0.48 | 0.01 |
| 2 | 3.1 | 0.66 | 0.10 | 4.0 | 0.47 | 0.00 |
| 3 | 3.2 | 0.62 | 0.12 | 4.9 | 0.46 | 0.01 |
| 4 | 3.4 | 0.69 | 0.13 | 5.0 | 0.39 | 0.01 |

TABLE 5

XPS analysis comparing the chemical composition of treated and untreated aluminum foils of different thickness

| | Treated | | | Untreated | | |
|---|---|---|---|---|---|---|
| Foil Thickness (μm) | Surface Layer Thickness (nm) | OH | F | Surface Layer Thickness (nm) | OH | F |
| 10 | 3.5 | 0.68 | 0.15 | 4.6 | 0.40 | 0.02 |
| 15 | 3.9 | 0.62 | 0.12 | 4.6 | 0.42 | 0.02 |
| 20 | 3.4 | 0.69 | 0.13 | 5.0 | 0.39 | 0.01 |
| 40 | 3.7 | 0.62 | 0.12 | 4.8 | 0.46 | 0.01 |

Table 6 gives XPS data for 20 μm aluminum foil treated with a 5% solution of Product A as the first step, followed by treatment with three different concentrations (1.5%, 10% and 25%) of Product C, and two different concentrations (1.5% and 10%) of Product G as individual second steps respectfully. Table 7 gives data for 20 μm aluminum foil treated with a 5% solution of Product B as the first step, followed by treatment with three different concentration (1.5%, 15% and 30%) of a single solution of Products D and E combined in a 1.2:1 ratio, and three different concentrations (1.25%, 12.5% and 25%) of Product E alone, as individual second steps respectfully.

TABLE 6

XPS analysis comparing the chemical composition of aluminum foil treated with different concentrations of two second treatment solutions

| Second Treatment | Surface Layer Thickness (nm) | OH | F | Zr | Ti |
|---|---|---|---|---|---|
| None | 3.2 | 0.59 | 0.12 | 0.00 | 0.00 |
| 1.5% Product C | 3.0 | 0.62 | 0.17 | 0.01 | 0.00 |
| 10% Product C | 2.9 | 0.63 | 0.20 | 0.01 | 0.00 |
| 25% Product C | 2.9 | 0.62 | 0.24 | 0.01 | 0.00 |
| 1.5% Product G | 3.3 | 0.77 | 0.10 | 0.02 | 0.02 |
| 10% Product G | 3.4 | 0.70 | 0.15 | 0.02 | 0.04 |

TABLE 7

XPS analysis comparing the chemical composition of aluminum foil treated with different concentrations of two second treatment solutions

| Second Treatment | Surface Layer Thickness (nm) | OH | F | Zr |
|---|---|---|---|---|
| None | 3.5 | 0.70 | 0.14 | 0.00 |
| 1.5% Product D + E | 3.0 | 0.67 | 0.16 | 0.02 |
| 15% Product D + E | 3.2 | 0.77 | 0.13 | 0.04 |
| 30% Product D + E | 3.1 | 0.90 | 0.14 | 0.06 |
| 1.25% Product E | 3.4 | 0.68 | 0.18 | 0.05 |
| 12.5% Product E | 3.2 | 0.70 | 0.27 | 0.06 |
| 25% Product E | 3.8 | 0.70 | 0.26 | 0.13 |

Test Results Relating to the Treated Layer's Resistivity/Resistance

Figure 9:
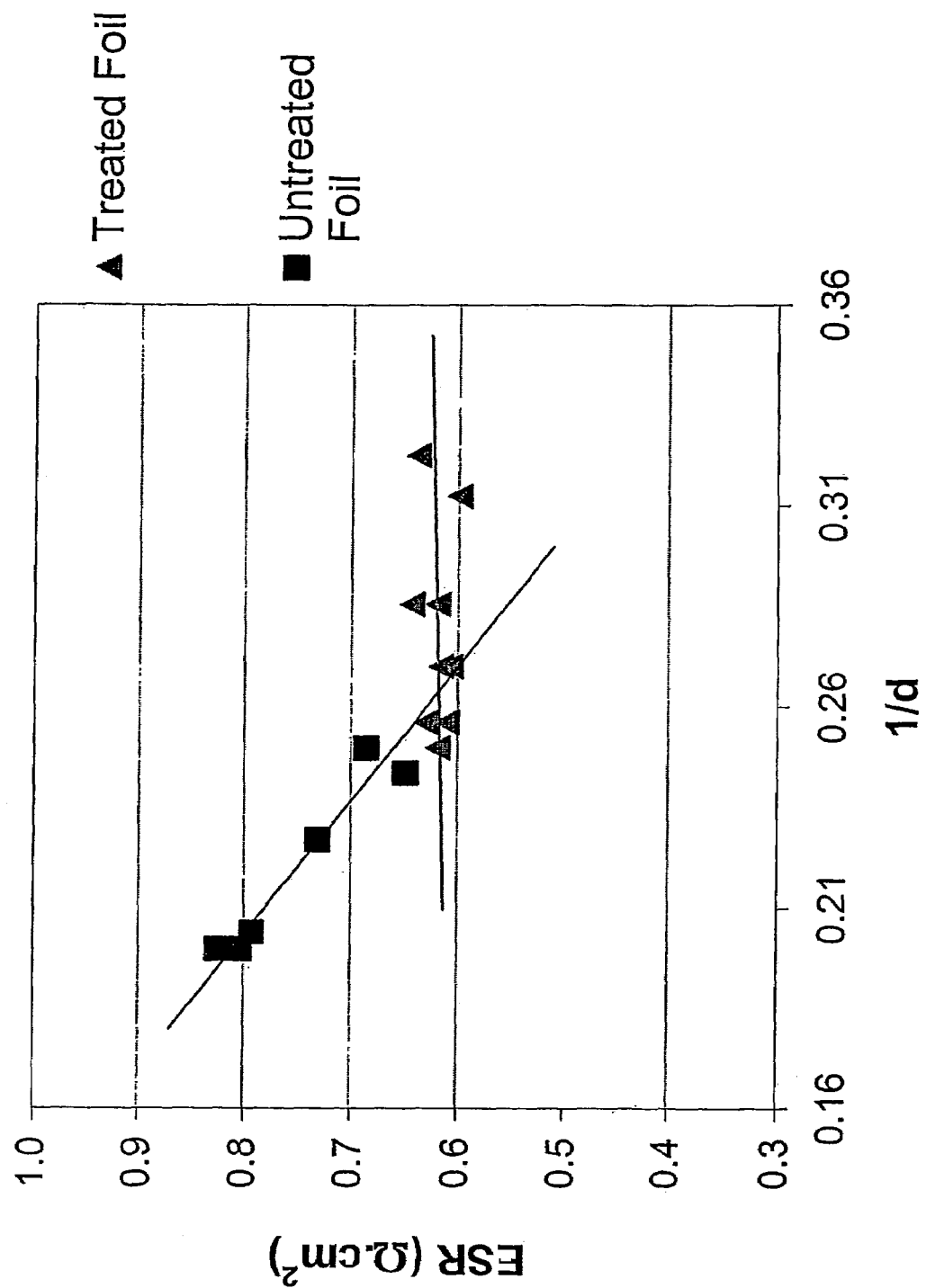
FIG. 9 is a comparative plot of the ESR as a function of $Al_2O_3$ thickness.

It is commonly known that for a layer with a given resistivity ($\rho$), the resistance (R) is proportional to the thickness. Further, as thickness decreases so does the Resistance. This is illustrated in FIG. 9, which plots the ESR of otherwise identical supercapacitors incorporating the untreated foil and foil treated with a first treatment solution, against the thickness (d) of the surface oxide layer. The ESR of the supercapacitors incorporating the untreated foil increases as the 'native' oxide layer increases in thickness. Importantly, contrary to what those skilled in the art would expect, there is no direct relationship between thickness (d) and ESR in the treated foils.

In all preferred embodiments, the treated layer has at least one of: different chemical and physical properties—as compared to an untreated layer. It is believed that this difference makes the thickness of the treated layer less important; as compared to the treated layer's chemical composition and physical parameters (porosity, density, pore structure etc). A consistent explanation is that the resistivity ($\rho$) of the treated layer is lower than that of the 'native' oxide layer.

Examples of the improvement in initial ESR of supercapacitors following treatment of the foil with a first treatment solution are given below.

In Table 8, 20 µm foil was cleaned with methanol; or treated with a 5% solution of Product A for 1 minute, water rinsed, and air-dried. Further, the foil was coated with a 6 µm, 11 µm, 15 µm or 40 µm carbon coating and assembled into a standard supercapacitor. The initial ESR values were measured at a 2.25V bias voltage and ambient conditions, and are given in Table 8. As can be seen below, the initial ESR is substantially reduced.

TABLE 8

Initial ESR of supercapacitors with different coating thickness

| Treatment | 6 µm Initial ESR ($\Omega \cdot cm^2$) | 11 µm Initial ESR ($\Omega \cdot cm^2$) | 15 µm Initial ESR ($\Omega \cdot cm^2$) | 40 µm Initial ESR ($\Omega \cdot cm^2$) |
|---|---|---|---|---|
| Methanol | 0.94 | 0.94 | 0.80 | 0.83 |
| 5% Product A | 0.59 | 0.63 | 0.67 | 0.67 |

Test Results Regarding Treatments and Concentrations

In Table 9, 20 µm foil was cleaned with methanol, or treated with either a 0.01%, 1%, 5%, 15%, 25% or 100% solution of either Product A and Product B respectfully; water rinsed; and air-dried. It was also coated with a 5 µm carbon coating and assembled into a standard supercapacitor. The initial ESR values measured at 2.25V bias voltage and ambient conditions, and are given in Table 9.

TABLE 9

Initial ESR of supercapacitors with different first treatment concentrations

| Solution Concentration (%) | Product A Initial ESR ($\Omega \cdot cm^2$) | Product B Initial ESR ($\Omega \cdot cm^2$) |
|---|---|---|
| Methanol | 0.83 | 0.83 |
| 0.01 | 0.80 | 0.61 |
| 5 | 0.60 | 0.53 |
| 15 | 0.61 | |
| 25 | 0.73 | 0.54 |
| 100 | 0.65 | 0.53 |

As Table 10 indicates, 20 µm aluminium foils from different suppliers were either untreated or treated with a 5% solution of product A for 1 minute, water washed and air dried. They were coated with a 6 µm carbon coating and assembled into a standard supercapacitor. The initial ESR was measured at 2.25V and ambient conditions.

TABLE 10

Initial ESR of supercapacitors after the following treatments

| Supplier | Treated Initial ESR ($\Omega \cdot cm^2$) | Untreated Initial ESR ($\Omega \cdot cm^2$) |
|---|---|---|
| 1 | 0.68 | 0.73 |
| 2 | 0.64 | 0.67 |
| 3 | 0.68 | 0.79 |
| 4 | 0.70 | 0.83 |

As Table 11 indicates, aluminium foils of different thicknesses were treated with a 5% solution of Product A for 1 minute, water washed and air-dried.

They were coated with an 11 µm carbon coating and assembled into a standard supercapacitor. The ESR was measured at 2.25V and ambient conditions.

TABLE 11

Initial ESR of supercapacitors after the following treatments

| Foil thickness (µm) | Initial ESR ($\Omega \cdot cm^2$) |
|---|---|
| 10 | 0.88 |
| 12 | 0.84 |
| 15 | 0.69 |
| 20 | 0.63 |
| 30 | 0.60 |
| 40 | 0.53 |

In Table 12, 20 µm foil was cleaned with methanol, or treated with either a 5% or 15% solution of Product A for various times; water rinsed; and air-dried. It was also coated with a 15 µm carbon coating and assembled into a standard supercapacitor. Initial ESR values were measured at 2.25V bias voltage and ambient conditions, and are given in Table 10.

TABLE 12

Initial ESR of supercapacitors with different first treatment
concentrations and treatment times

| Treatment Time (s) | 5% Treatment Initial ESR ($\Omega \cdot cm^2$) | 15% Treatment Initial ESR ($\Omega \cdot cm^2$) |
|---|---|---|
| Methanol | 0.80 | 0.80 |
| 15 | 0.60 | 0.62 |
| 20 | 0.61 | 0.62 |
| 30 | 0.62 | 0.63 |
| 60 | 0.60 | 0.61 |

In Table 13, 40 μm aluminium foil was treated with a 5% solution of Product A for one minute, water rinsed, and air-dried. It was also coated with a 6 μm carbon coating and assembled into a supercapacitor constructed as a stack of ten pairs of electrodes in parallel, with each electrode having a 2.1 cm² geometric area and separated by a 20 μm PET separator. Initial performance data was measured between 2.5V and 0V at ambient conditions, and is given in Table 11.

TABLE 13

Initial performance data of a supercapacitor made from
foil treated with a first treatment solution only

| Performance Parameter | Value |
|---|---|
| Initial ESR | 0.43 $\Omega \cdot cm^2$ |
| Capacitance | 0.50 F |
| Energy | 0.47 mWh |
| Unpackaged Gravimetric Energy Density | 0.85 Wh.kg$^{-1}$ |
| Packaged Gravimetric Energy Density | 0.71 Wh.kg$^{-1}$ |
| Packaged Volumetric Energy Density | 1.02 Wh.L$^{-1}$ |
| RC Time Constant | 0.0072 |
| Power ($P = V^2/4R$) | 109 kW |
| Unpackaged Gravimetric Power Density | 199 kW.kg$^{-1}$ |
| Packaged Gravimetric Power Density | 166 kW.kg$^{-1}$ |
| Packaged Volumetric Power Density | 237 kW.L$^{-1}$ |

Examples of initial ESRs of supercapacitors following treatment of the foil with the first treatment solution and a subsequent treatment with a second treatment solution, are given below. As shown in Table 14, 20 μm foil was either cleaned with methanol, and respectfully treated as a first step with a 5% solution of Product A for one minute, water rinsed, air-dried. As a second step, the foil was subsequently treated with a 25% solution of Product C, water rinsed, air-dried. Further, the foils were coated with a 6 μm or 15 μm carbon coating and assembled into a standard supercapacitor.

TABLE 14

Initial ESR of supercapacitors after treatment
in the second treatment solution

| First Treatment | Second Treatment | 6 μm Coating Initial ESR ($\Omega \cdot cm^2$) | 15 μm Coating Initial ESR ($\Omega \cdot cm^2$) |
|---|---|---|---|
| Methanol | None | 0.83 | 0.83 |
| 5% Product A | None | 0.62 | 0.59 |
| 5% Product A | 25% Product C | 0.63 | 0.62 |

As shown in Table 15, 20 μm foil was either cleaned with methanol, or treated as a first step with a 5% solution of Product B for one minute, water rinsed, air-dried. As a second step the foil was subsequently treated with a 1.5% single solution of Products D and E combined in a 1.2:1 ratio, water rinsed, air-dried. The foil was further coated with a 15 μm carbon coating and assembled into a standard supercapacitor.

TABLE 15

Initial ESR of supercapacitors after treatment
in the second treatment solution

| First Treatment | Second Treatment | Initial ESR ($\Omega \cdot cm^2$) |
|---|---|---|
| Methanol | None | 0.79 |
| 5% Product B | None | 0.59 |
| 5% Product B | 1.5% Product D + E | 0.63 |

As shown in Table 16, either 20 μm or 40 μm foil was treated, as a first step, with a 5% solution of Product A for one minute; water rinsed; and air-dried. As a second step, the foil was subsequently treated with a 25% solution of Product C, water rinsed, and air-dried. The foils were also coated with a 6 μm carbon coating an assembled into a standard supercapacitor with either a 20 μm or 50 μm separator.

TABLE 16

Initial ESR of supercapacitors with different physical
configurations after treatment in the second treatment solution

| Foil Thickness (μm) | Separator Thickness (μm) | Initial ESR ($\Omega \cdot cm^2$) |
|---|---|---|
| 20 | 20 | 0.44 |
| 40 | 20 | 0.36 |
| 20 | 50 | 0.60 |
| 40 | 50 | 0.46 |

As shown in Table 17, 20 μm foil was either cleaned with methanol, or treated as a first step with a 5% solution of Product B for one minute, water rinsed, air-dried. As a second step the foil was subsequently treated with a 1.5% solution of Product F, water rinsed, and air-dried. Further, they were coated with a 15 μm carbon coating and assembled into a standard supercapacitor.

TABLE 17

Initial ESR of supercapacitors after treatment
in the second treatment solution

| Treatment | Treatment | Initial ESR ($\Omega \cdot cm^2$) |
|---|---|---|
| Methanol | None | 0.79 |
| 5% Product B | None | 0.65 |
| 5% Product B | 1.5% Product F | 0.64 |

As shown in Table 18, 20 μm foil was either cleaned with methanol, or treated as a first step with a 5% solution of Product A for one minute, water rinsed, air-dried. As a second step the foil was subsequently treated with a 1.5% solution of Product G, water rinsed, air-dried. Further, it was coated with a 6 μm carbon coating and assembled into a standard supercapacitor.

TABLE 18

Initial ESR of supercapacitors after treatment in the second treatment solution

| Treatment | Treatment | Initial ESR ($\Omega \cdot cm^2$) |
|---|---|---|
| Methanol | None | 0.79 |
| 5% Product A | None | 0.62 |
| 5% Product A | 1.5% Product G | 0.64 |

As shown in Table 19, 20 μm foil was treated, as a first step, with a 5% solution of Product A for one minute; water rinsed; and air-dried. As a second step, the foil was subsequently treated with a 25% solution of Product C and either water rinsed and air-dried, or not rinsed and air-dried. Further, it was coated with a 6 μm carbon coating and assembled into a standard supercapacitor

TABLE 19

Initial ESR of supercapacitors after treatment in the second treatment solution

| Treatment | Initial ESR ($\Omega \cdot cm^2$) |
|---|---|
| Rinsed | 0.64 |
| Not Rinsed | 1.31 |

As shown in Table 20, 20 μm foil was treated, as a first step, with a 5% solution of Product A for one minute; water rinsed; and air-dried. As a second step, the foil was subsequently treated with a 1.5%, 10% or 25% solution of Product C, water rinsed, air-dried. Further, it was coated with a 6 μm carbon coating and assembled into a standard supercapacitor with an electrolyte having a conductivity of 32 mS.cm$^{-1}$.

TABLE 20

Initial ESR of supercapacitors after the following treatments

| Treatment | Treatment | Initial ESR ($\Omega \cdot cm^2$) |
|---|---|---|
| None | None | 2.02 |
| 5% Product A | None | 0.84 |
| 5% Product A | 1.5% Product C | 0.84 |
| 5% Product A | 10% Product C | 0.84 |
| 5% Product A | 25% Product C | 0.84 |

As shown in Table 21, 20 μm foil was treated, as a first step, with a 5% solution of Product B for one minute; water rinsed; and air-dried. As a second step, the foil was subsequently treated with either a 1.5%, 15% or 30% single solution of Products D and E combined in a 1.2:1 ratio, or a 1.25%, 12.5% or 25% solution of Product E, water rinsed, air-dried. It was further coated with a 6 μm carbon coating and assembled into a standard supercapacitor with an electrolyte having a conductivity of 32 mS.cm$^{-1}$.

TABLE 21

Initial ESR of supercapacitors after the following treatments

| Treatment | Treatment | Initial ESR ($\Omega \cdot cm^2$) |
|---|---|---|
| None | None | 2.02 |
| 5% Product B | None | 0.83 |
| 5% Product B | 1.5% Product D + E | 0.85 |
| 5% Product B | 15% Product D + E | 0.86 |
| 5% Product B | 30% Product D + E | 0.83 |
| 5% Product B | 1.25% Product E | 0.86 |
| 5% Product B | 12.5% Product E | 0.88 |
| 5% Product B | 25% Product E | 0.88 |

As shown in Table 22, 20 μm foil was treated, as a first step, with a 5% solution of Product B for one minute; water rinsed; and air-dried. As a second step, the foil was subsequently treated with a 1.5% solution of Product F. It was further coated with a 15 μm carbon coating and assembled into a standard supercapacitor with an electrolyte having a conductivity of 32 mS.cm$^{-1}$.

TABLE 22

Initial ESR of supercapacitors after the following treatments

| Treatment | Treatment | Initial ESR ($\Omega \cdot cm^2$) |
|---|---|---|
| None | None | 2.02 |
| 5% Product B | None | 0.99 |
| 5% Product B | 1.5% Product F | 0.96 |

As shown in Table 23, 20 μm foil was treated, as a first step, with a 5% solution of Product A for one minute; water rinsed; and air-dried. As a second step the foil was subsequently treated with a 1.5% or 10% solution of Product G, and water rinsed, and air-dried. It was further coated with a 6 μm carbon coating and assembled into a standard supercapacitor with an electrolyte having a conductivity of 32 mS.cm$^{-1}$.

TABLE 23

Initial ESR of supercapacitors after the following treatments

| Treatment | Treatment | Initial ESR ($\Omega \cdot cm^2$) |
|---|---|---|
| None | None | 2.02 |
| 5% Product A | None | 0.84 |
| 5% Product A | 1.5% Product G | 0.82 |
| 5% Product A | 10% Product G | 0.82 |

As shown in Table 24, 40 μm aluminium foil was treated with a 5% solution of Product A for one minute, water rinsed and air-dried. As a second step the foil was subsequently treated with a 25% solution of Product C, water rinsed and air-dried. It was further coated with a 6 μm carbon coating and assembled into a standard supercapacitor with a 20 μm separator.

TABLE 24

Initial performance data of a supercapacitor made from foil treated with first and second treatment solutions

| Performance Parameter | Value |
|---|---|
| Initial ESR | 0.36 $\Omega \cdot cm^2$ |
| Capacitance | 0.51 F |

TABLE 24-continued

Initial performance data of a supercapacitor made from foil treated with first and second treatment solutions

| Performance Parameter | Value |
| --- | --- |
| Energy | 0.47 mWh |
| Unpackaged Gravimetric Energy Density | 0.85 Wh · kg$^{-1}$ |
| Packaged Gravimetric Energy Density | 0.71 Wh · kg$^{-1}$ |
| Packaged Volumetric Energy Density | 1.02 Wh · L$^{-1}$ |
| RC Time Constant | 0.0065 |
| Power (P = V$^2$/4R) | 122 kW |
| Unpackaged Gravimetric Power Density | 222 kW · kg$^{-1}$ |
| Packaged Gravimetric Power Density | 185 kW · kg$^{-1}$ |
| Packaged Volumetric Power Density | 266 kW · L$^{-1}$ |

Test Results Relating to the Treated Layer's Resistance (ESR) Stability

A common observation in supercapacitors or other electrochemical energy storage devices is that the ESR of the device increases with time. Since the power (P) that a device can deliver decreases with increased resistance (R), it is preferable that the device does not increase in ESR under storage or operating conditions.

The following examples illustrate that the invention substantially reduces the increase in ESR—'ESR rise'—of supercapacitors with time.

As shown below, the ESR rise of the supercapacitor employed is reduced to due to the presence of the treated layer. It is believed that the reduction in ESR rise rate is due to the treated layer forming a barrier to species that may cause growth of the surface layer, or the treated layer, including species that negate the effect of species that would otherwise cause growth of the surface layer. It is believed that the improved barrier property is due to a modification of the surface layer such that it has at least one of: different chemical, and different physical properties—as compared to the native oxide layer. In some embodiments, these properties include at least one of the following: density, porosity, pore structure, reduced chemical reactivity, and other traits.

Further, there exists a relationship between ESR rise, temperature, and voltage. By the commonly understood Arrhenius principal, a relationship exists between chemical reactions and temperature, those skilled in the art will understand that the ESR rise rate increases as a function of temperature. Further, higher voltages tend to accelerate ESR rise. Although the relationship between ESR rise and voltage is dependant upon the chemical composition of the electrochemical system, and is not explicitly understood, those skilled in the art will realize that combinations of voltage and temperature will affect the ESR rise.

Although the examples described herein give certain voltages and temperatures of operation, it will be clear to those skilled in the art from the teachings herein that if the temperature of operation is decreased, the voltage may be increased to a value no more than a value determined by the chemical components of the system. In essence, decreasing the temperature of operation will allow the device to operate at a higher voltage and maintain the same ESR rise performance. The reverse case will also be apparent. That is, if the operating temperature is increased, ESR rise performance will tend to deteriorate unless the operating voltage is reduced.

Figure 5:
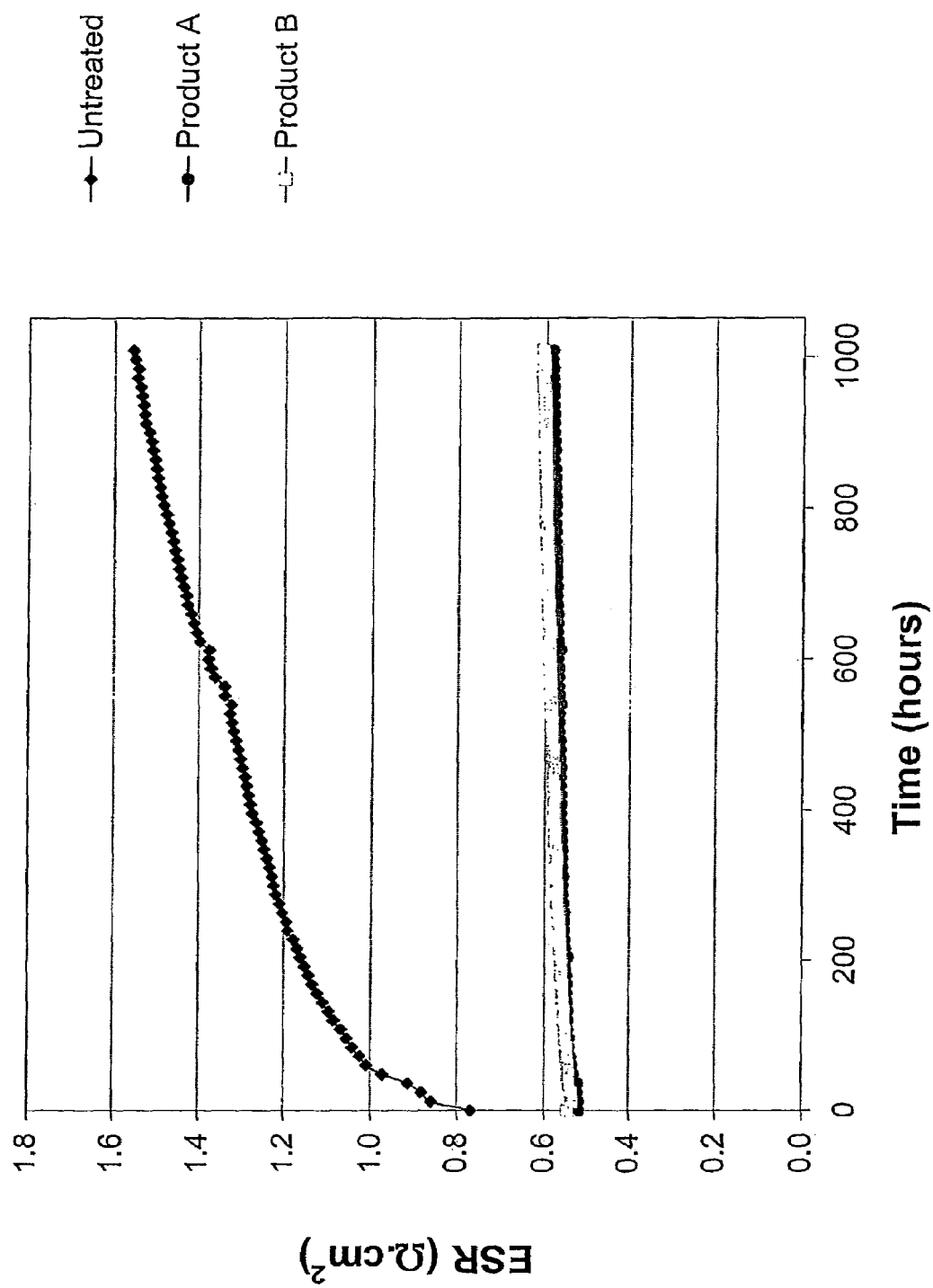
FIG. 5 is a comparative plot of ESR versus time for a number of supercapacitors, the control being an untreated foil and the others including foil treated in accordance with the invention.

In this light, reference is now made to FIG. 5, which shows the ESR rise at 2.25V, 10% relative humidity, and 50° C. for three standard supercapacitors prepared from 20 μm aluminium foils given different first treatments. That is, all of the superconductors used in the tests are "standard"—as described within this document—unless otherwise stated. Again, it will be clear to those skilled in the art that other capacitors are used in alternate embodiments.

The ESR is plotted over the first 1000 hrs of their operation. As, FIG. 5 shows, the ESR rise rate for supercapacitors prepared from aluminium foil treated with either Product A and Product B respectfully is lower—as compared to the untreated foil.

It will be additionally observed that the supercapacitor prepared with untreated foil has an initial ESR of about 0.70 $\Omega.cm^2$, which rises steeply in the first 50 to 100 hours of operation before increasing approximately linearly at about 0.03 $\Omega.cm^2$ per 100 hours. This typical characteristic has traditionally required the initial ESR in such devices be kept very low—often at the expense of other performance—to ensure that the ESR at a given later time meets the required performance specification for the device's application.

As seen from these results, the treated supercapacitors outperform the untreated one in at least two ways. That is, the initial ESR is less; and, the rise rate of the ESR over the operational lifetime of the supercapacitors is less. For example, the supercapacitor prepared with Product A treated foil demonstrates an initial ESR of about 0.52 $\Omega.cm^2$, and a rise rate of less than about 0.004 $\Omega.cm^2$ per 100 hours over about 1000 hours. Similarly, the supercapacitor prepared with Product B treated foil demonstrates an initial ESR of about 0.54 $\Omega.cm^2$, and a rise rate of less than about 0.006 $\Omega.cm^2$ per 100 hours over about 1000 hours.

Moreover, after about 1000 hours, the ESR of the Product A supercapacitor and the Product B supercapacitor remained less than 115% of their respective initial ESR. In sharp contrast, after about 1000 hours, the ESR of the untreated supercapacitor exceeded 150% of its initial ESR.

Figure 6:
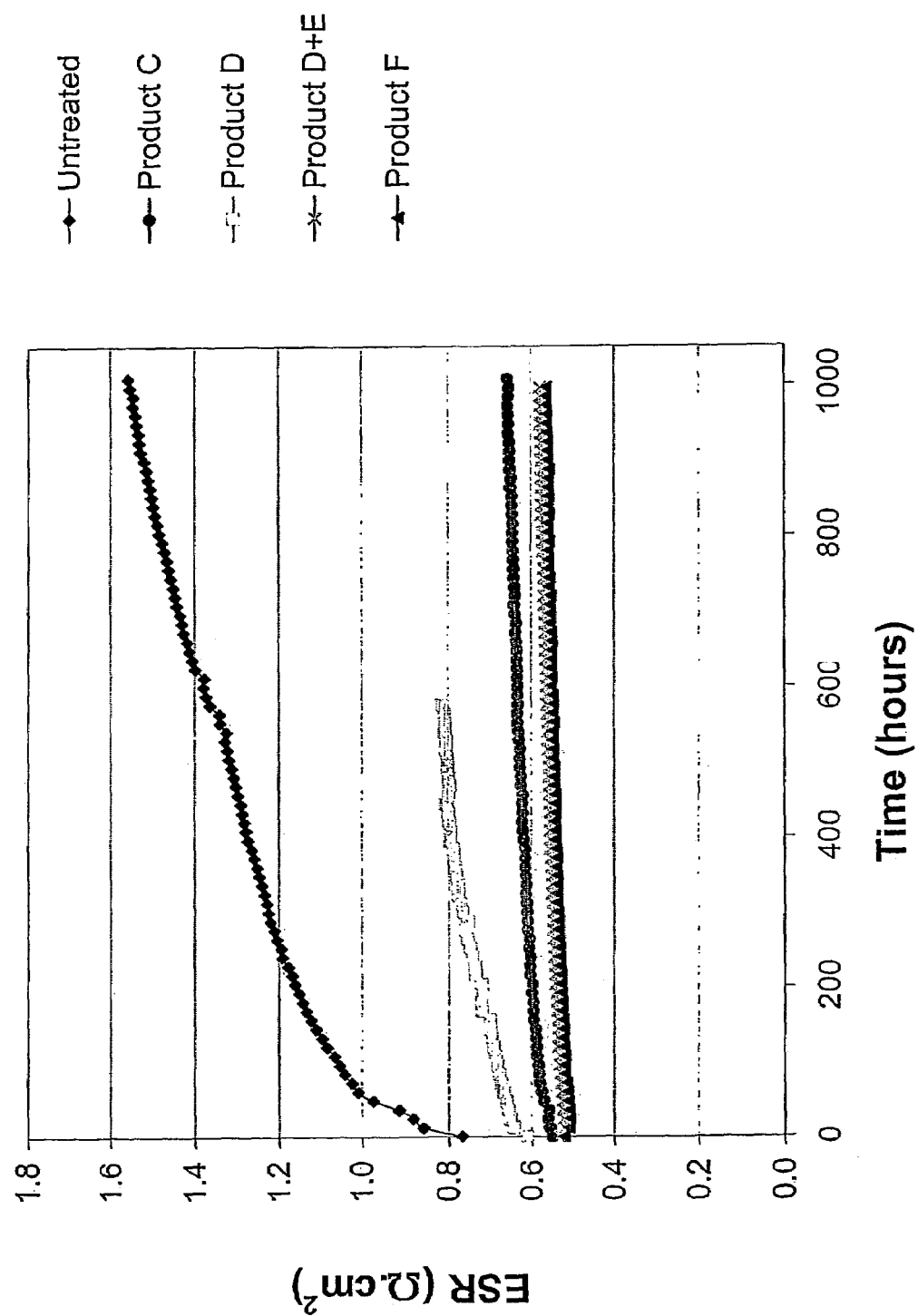
FIG. 6 is a comparative plot of ESR versus time for a number of supercapacitors, the control being the untreated foil of FIG. 5 and the others including foil treated in accordance with alternative embodiments of the invention.

The treatments underlying FIG. 6 are analogous to those described above with reference to FIG. 5. That is, the ESR was measured over 1,000 hours, with the respective supercapacitors held at 2.25 Volts, at a temperature of 50° C., and with 10% relative humidity.

FIG. 6 includes a reference ESR plot for a supercapacitor having an untreated foil, and four other plots for like standard supercapacitors having foils that have undergone a two-step treatment in accordance with a preferred embodiment of the invention. In each of these four cases, the first step involved treatment with a 5% solution of Product B. The subsequent second step involved treatment with either a 2.5% solution of Product C, a 1.5% solution of Product D, a 1.5% single solution of Products D and E combined in a 1.2:1 ratio, or a 1.5% solution of Product F, as referred to in FIG. 6's legend.

A summary of the initial ESR and ESR rise rates from FIG. 6 are provided below in Table 25. In addition, the numbers in parenthesis represent the ESR expressed as a percentage of the initial ESR.

TABLE 25

Initial ESR and change in ESR with time for supercapacitors made from treated foil

| | First Treatment | | | |
|---|---|---|---|---|
| | None | Product B (5%) | Product B (5%) | Product B (5%) | Product B (5%) |
| | Second Treatment | | | |
| | None | Product C (2.5%) | Product D (1.5%) | Product D + E (1.5%) | Product F (1.5%) |
| Initial ESR (Ω · cm$^2$) | 0.69 (100%) | 0.55 (100%) | 0.61 (100%) | 0.52 (100%) | 0.52 (100%) |
| ESR at about 200 hours (Ω · cm$^2$) | 0.87 (125%) | 0.60 (108%) | 0.72 (118%) | 0.54 (103%) | 0.53 (101%) |
| ESR at about 600 hours (Ω · cm$^2$) | 0.98 (141%) | 0.63 (114%) | 0.83 (137%) | 0.56 (107%) | 0.55 (105%) |
| ESR at about 1000 hours (Ω · cm$^2$) | 1.06 (152%) | 0.65 (118%) | | 0.58 (111%) | 0.57 (108%) |
| Rise rate after 200 hours (Ω · cm$^2$ per 100 hours) | 0.022 | 0.007 | 0.028 | 0.005 | 0.005 |

It is apparent from FIG. 6 and Table 25 that each of the four treatments provides substantial decreases in the initial ESR vis a vis the supercapacitor that includes untreated foil. Specifically, the decreases range from about 12% to 25%.

With the exception of the foil treated with Product D as a second step, the supercapacitors including treated foils demonstrate significantly lower ESR rise rate compared to that including untreated foil. That is, the ESR rise rate in Table 23 for the Product D treated foil is roughly equivalent to that of the untreated foil. This can be understood if the compositions of the Products are examined as disclosed herein. Product D does not contain the dopants described by the invention. That is, Product D is a counter example.

After about 1000 hours of operation, the ESR has increased in all cases. However, the supercapacitor constructed with untreated foil has an ESR after 1000 hours that exceeds 150% of the initial ESR. In contrast, the ESR after 1000 hours for supercapacitors constructed with foil treated with Products C, Products D+E or Product F is less that 120% of the initial ESR.

Figure 7:
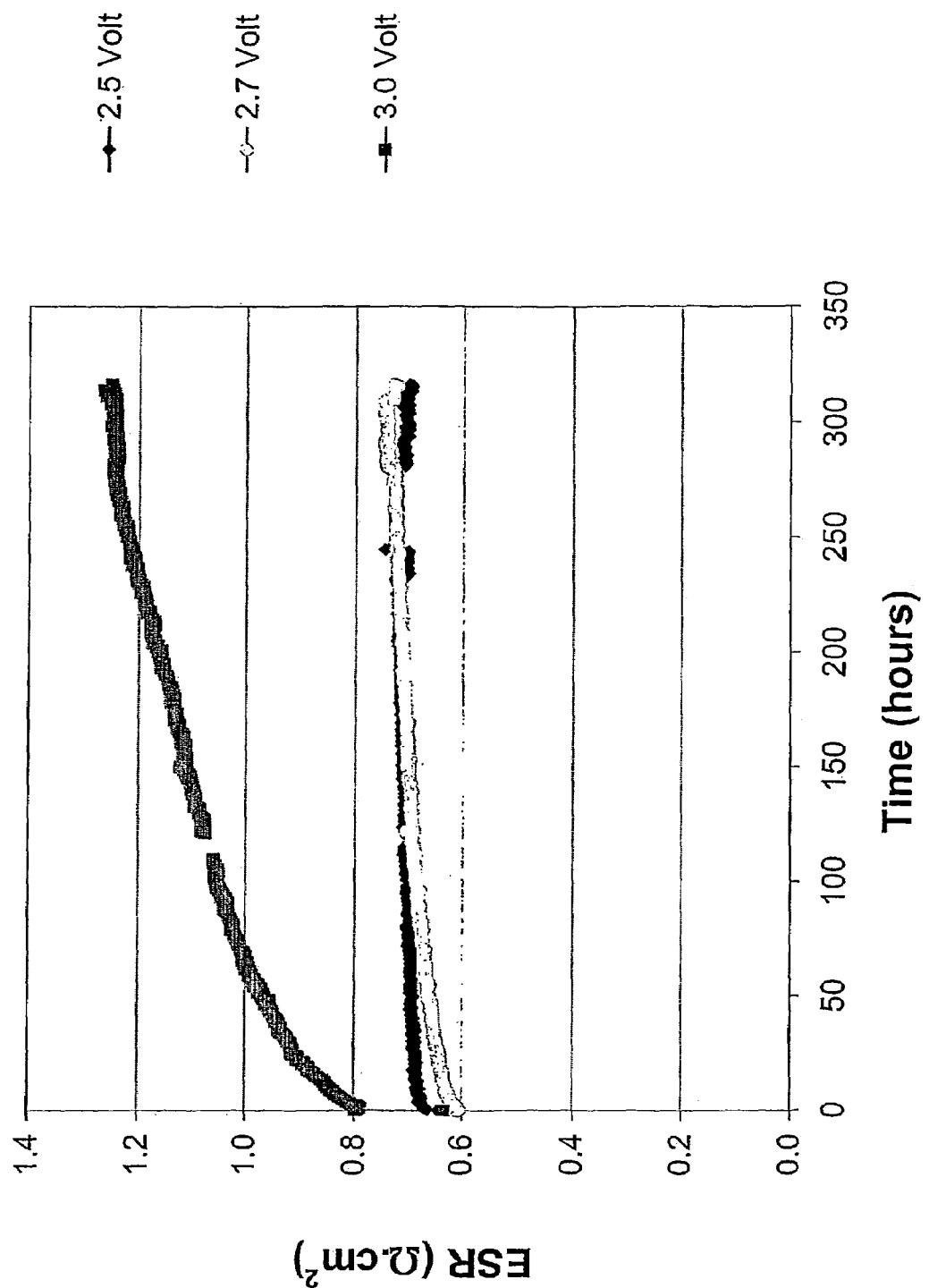
FIG. 7 is a comparative plot of the ESR against time for a supercapacitor according to the invention at three different operational voltages.

In addition to reducing the ESR rise at 2.25 Volts, a preferred embodiment also provides substantial benefits allowing cells to operate at higher voltages. In FIG. 7, a single cell supercapacitor having foil treated as a first step with a 5% solution of Product A in accordance with the invention is compared to a supercapacitor with untreated foil. The ESR was measured over more than 300 hours, with the respective supercapacitors held at 2.5, 2.7 or 3.0 Volts, at a temperature of 50° C., and with 10% relative humidity.

It is apparent from FIG. 7 that the ESR rise rate at 2.7 Volts is very similar to the ESR rise rate at 2.5 Volts. By operating at this elevated voltage, as opposed to the 2.3 Volt upper limit of known commercial devices, the preferred embodiment provides an increase—by a factor of $(2.7/2.3)^2 = 1.38$—in the energy density and power density for a given supercapacitor. This increase in energy and power density arises because the formulae for each of these densities contain a voltage-squared ($V^2$) term as shown by Equations 1 and 2 above.

As can easily be seen, the ESR rise rate at 3 V, as given in FIG. 7, is comparable to the ESR rise rate at 2.25 V for a supercapacitor constructed with untreated foil, as given in FIG. 5. Supercapacitors made using the invention as disclosed herein have an advantage over supercapacitors made with untreated foil, in that they may operate at higher voltages. As a consequence of the higher operating voltage, supercapacitors making use of the invention have an advantage in power and energy density.

Figure 8:
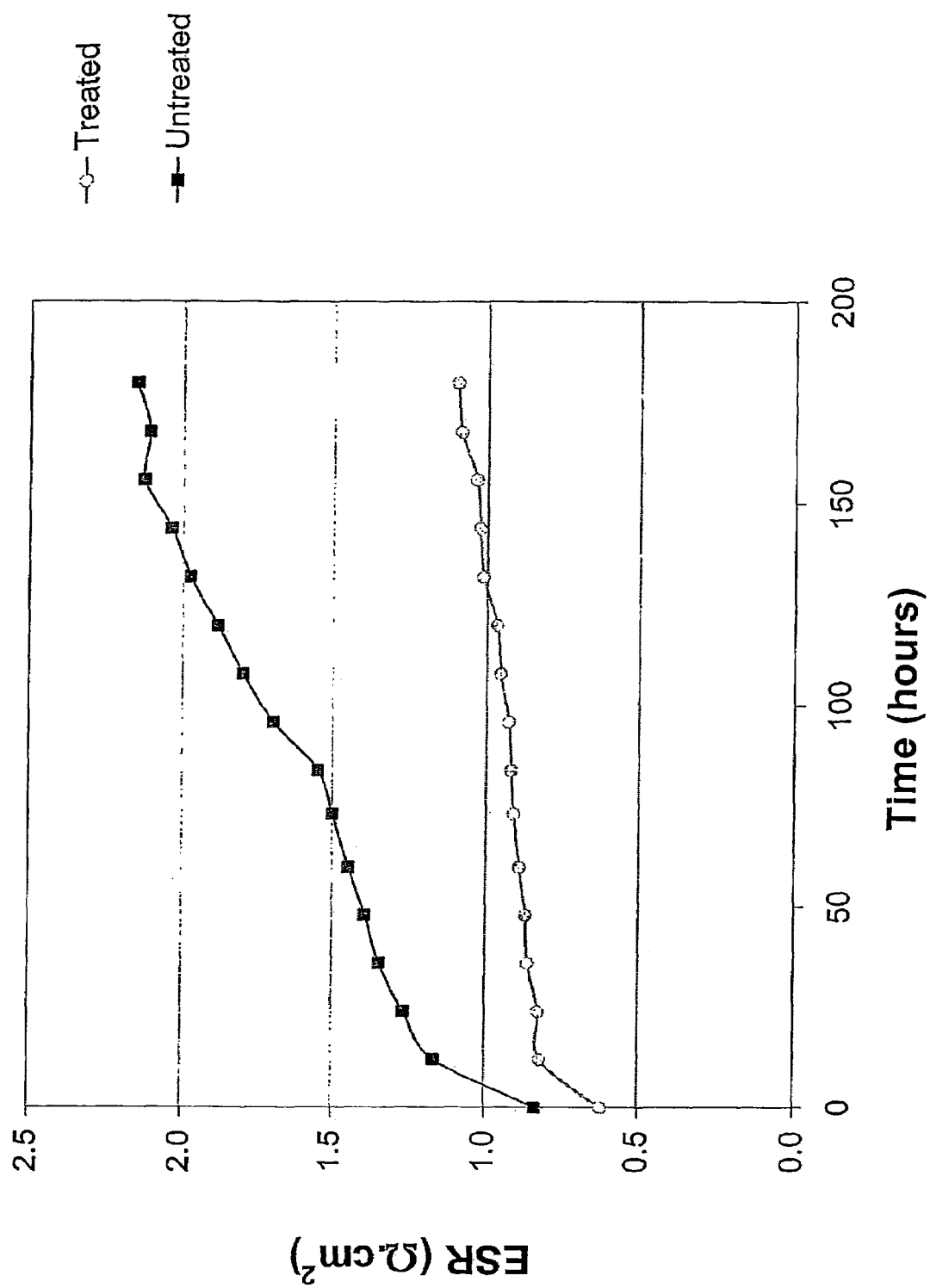
FIG. 8 is a comparative plot of the ESR against time for a supercapacitor according to the invention and a supercapacitor with an untreated electrode when operated at three volts.

To further illustrate the advantages that the invention provides in terms of operating voltage, FIG. 8 provides a plot of the ESR rise for two supercapacitors operated at 3 Volts, where one includes untreated foil and the other includes foil treated as a single step in a 5% solution of Product A. Further, a preferred embodiment offers an improvement in operational lifetime at various voltages.

Tests Results Relating to Adhesion between a Coating and the Foil

It has been observed that the treatment of the foil to form a layer 3 provides additional unforeseen advantages such as an improvement in the adhesion between a coating and the foil. By way of background, it is important for good adhesion between these two components to ensure robustness during manufacture and subsequent handling. Further, it is clear to those skilled in the art and from the teachings herein that improved adhesion between any coating and the foil can minimize ESR by maximizing the effective geometric area of an electrode.

An example of the improvement in the adhesion characteristics offered by a preferred embodiment of the invention is provided in Table 24. In this example, the foil was treated as a first step in a 5% solution of Product B for 1 minute, water rinsed and air-dried. Subsequently in a second step the foil was treated for 1 minute in a 1.5% single solution of Products D and E combined in a 1.2:1 ratio, water rinsed and air-dried. A carbon coating of the required thickness was applied to the dry foil.

TABLE 26

Adhesion of Carbon Coatings to Treated and Untreated Foil

| Foil Treatment | Coating Thickness (μm) | Adhesion (g) |
|---|---|---|
| Untreated | 40 | 600 |
| Products D + E | 40 | 900 |
| Untreated | 38 | 600 |
| Products D + E | 38 | 800 |
| Untreated | 50 | 675 |
| Products D + E | 43 | 800 |

The invention claimed is:

1. An energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an initial ESR that is less than approximately 0.3 $\Omega.cm^2$.

2. An electrode for an energy storage device according to claim 1, wherein the treated layer includes one or more dopants.

3. An electrode for an energy storage device according to claim 2, wherein the one or more dopants include at least any one halide.

4. An electrode for an energy storage device according to claim 2, wherein the one or more dopants include at least a fluoride.

5. An electrode for an energy storage device according to claim 2, wherein the one or more dopants includes at least any one element except the metal, or O.

6. An electrode for an energy storage device according to claim 2, wherein the at least one metal is an alloy primarily comprised of the at least one metal and at least one other substance, and wherein the one or more dopants includes at least any one element—except the at least one metal at least substantially without the at least one other substance, or O.

7. An electrode for an energy storage device according to claim 2, wherein the one or more dopants includes at least any one species that forms principally ionic bonds.

8. An electrode for an energy storage device according to claim 2, wherein the one or more dopants includes at least any one metal ion.

9. An electrode for an energy storage device according to claim 2, wherein the one or more dopants include at least any one "transition metal" from Groups 3–12 of the IUPAC Periodic Table.

10. An electrode for an energy storage device according to claim 2, wherein the one or more dopants include at least one tetravalent ion wherein the tetravalent ion is at least one of Si, Ge, Sn, Pb, Se, V, Cr, Mo, W, Mn, Ti, Zr, Hf, Ce, Pr, and Tb.

11. An electrode for an energy storage device according to claim 2, wherein the one or more dopants include at least one tetravalent ion that forms principally ionic bonds wherein the tetravalent ion that forms principally ionic bonds is at least one of —Sn, Pb, V, Cr, Mo, W, Mn, Ti, Zr, Hf, Ce, Pr, and Tb.

12. An electrode for an energy storage device according to claim 2, wherein the one or more dopants include at least any one element from Group 4 of the Periodic Table.

13. An electrode for an energy storage device according to claim 2, wherein the one or more dopants include at least one of Ti, Zr, and Hf.

14. An electrode for an energy storage device according to claim 1, wherein the treated layer has a lesser thickness than the native oxide layer.

15. An electrode for an energy storage device according to claim 14, wherein the lesser thickness is less than 95% of the thickness of the native oxide layer.

16. An electrode for an energy storage device according to claim 14, wherein the lesser thickness is less than 85% of the thickness of the native oxide layer.

17. An electrode for an energy storage device according to claim 14, wherein the lesser thickness is less than 75% of the thickness of the native oxide layer.

18. An energy storage device having two or more electrodes, wherein at least one of the electrodes includes a substrate of at least one metal that forms a native oxide layer, and a treated layer formed on the substrate from the native oxide layer, the treated layer having a resistance that is less than the resistance of a native oxide layer; wherein the device has an ESR after 1000 hours of operation that is less than approximately 1.0 $\Omega.cm^2$.

* * * * *